United States Patent
Carbune et al.

(10) Patent No.: US 12,057,119 B2
(45) Date of Patent: **\*Aug. 6, 2024**

(54) CONTEXTUAL SUPPRESSION OF ASSISTANT COMMAND(S)

(71) Applicant: GOOGLE LLC, Mountain View, CA (US)

(72) Inventors: Victor Carbune, Zurich (CH); Matthew Sharifi, Kilchberg (CH); Ondrej Skopek, Zurich (CH); Justin Lu, Zurich (CH); Daniel Valcarce, Zurich (CH); Kevin Kilgour, Oetwil an der Limmat (CH); Mohamad Hassan Rom, Volketswil (CH); Nicolo D'Ercole, Oberrieden (CH); Michael Golikov, Merlischachen (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,883

(22) Filed: Jan. 3, 2023

(65) Prior Publication Data
US 2023/0143177 A1 May 11, 2023

Related U.S. Application Data

(63) Continuation of application No. 17/321,994, filed on May 17, 2021, now Pat. No. 11,557,293.

(51) Int. Cl.
*G10L 15/22* (2006.01)
*G10L 15/05* (2013.01)
(Continued)

(52) U.S. Cl.
CPC .............. *G10L 15/22* (2013.01); *G10L 15/05* (2013.01); *G10L 15/1815* (2013.01);
(Continued)

(58) Field of Classification Search
CPC ... G10L 15/22; G10L 2015/223; G10L 15/05; G10L 15/1822; G10L 15/063;
(Continued)

(56) References Cited

U.S. PATENT DOCUMENTS 10,365,887 B1 * 7/2019 Mulherkar .............. G06F 3/167
10,720,159 B1 * 7/2020 Sindhwani ............ G06F 40/169
(Continued)

FOREIGN PATENT DOCUMENTS

WO  2021022032  2/2012

OTHER PUBLICATIONS

European Patent Office; International Search Report and Written Opinion for Ser. No. PCT/US2021/063359; 19 pages; dated Jun. 28, 2022.

(Continued)

*Primary Examiner* — Vijay B Chawan
(74) *Attorney, Agent, or Firm* — Gray Ice Higdon

(57) ABSTRACT

Some implementations process, using warm word model(s), a stream of audio data to determine a portion of the audio data that corresponds to particular word(s) and/or phrase(s) (e.g., a warm word) associated with an assistant command, process, using an automatic speech recognition (ASR) model, a preamble portion of the audio data (e.g., that precedes the warm word) and/or a postamble portion of the audio data (e.g., that follows the warm word) to generate ASR output, and determine, based on processing the ASR output, whether a user intended the assistant command to be performed. Additional or alternative implementations can process the stream of audio data using a speaker identification (SID) model to determine whether the audio data is sufficient to identify the user that provided a spoken utter-
(Continued)

ance captured in the stream of audio data, and determine if that user is authorized to cause performance of the assistant command.

20 Claims, 11 Drawing Sheets

(51) Int. Cl.
  *G10L 15/18* (2013.01)
  *G10L 25/78* (2013.01)
  *G10L 15/08* (2006.01)
(52) U.S. Cl.
  CPC ........ *G10L 25/78* (2013.01); *G10L 2015/088* (2013.01); *G10L 2015/223* (2013.01)
(58) Field of Classification Search
  CPC ... G10L 15/26; G10L 2015/225; G10L 15/08; G10L 15/1815; G10L 25/78
  See application file for complete search history.

(56) References Cited

U.S. PATENT DOCUMENTS

| | | | | |
|---|---|---|---|---|
| 11,355,098 | B1* | 6/2022 | Zhong | G10L 15/22 |
| 11,380,322 | B2* | 7/2022 | Lang | G06F 3/165 |
| 2017/0116994 | A1* | 4/2017 | Wang | G10L 15/144 |
| 2018/0182390 | A1* | 6/2018 | Hughes | G10L 15/22 |
| 2019/0295544 | A1* | 9/2019 | Garcia | G06F 3/167 |
| 2019/0371310 | A1 | 12/2019 | Fox et al. | |
| 2019/0371342 | A1* | 12/2019 | Tukka | H04W 52/0229 |
| 2020/0250382 | A1* | 8/2020 | Mars | G06F 16/3329 |
| 2020/0312303 | A1 | 10/2020 | Roeck | |
| 2020/0342855 | A1 | 10/2020 | Casado | |
| 2020/0342866 | A1 | 10/2020 | Casado et al. | |
| 2020/0365154 | A1* | 11/2020 | Sindhwani | G06Q 30/0635 |
| 2021/0004539 | A1* | 1/2021 | Lee | G06F 40/284 |
| 2021/0065693 | A1 | 3/2021 | Sharifi et al. | |
| 2021/0264902 | A1* | 8/2021 | Larson | G06F 40/35 |
| 2022/0366903 | A1 | 11/2022 | Carbune et al. | |

OTHER PUBLICATIONS

European Patent Office; Invitation to Pay Additional Fees for PCT Ser. No. PCT/US2021/063359; 13 pages; dated May 4, 2022.
European Patent Office; Examination Report issued for Application No. 21854768.5, 6 pages, dated Feb. 19, 2024.

* cited by examiner

CONTEXTUAL SUPPRESSION OF ASSISTANT COMMAND(S)

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide spoken natural language input (i.e., spoken utterances) to an automated assistant, which may in some cases be converted into text and then processed, and/or by providing textual (e.g., typed) natural language input. An automated assistant generally responds to the spoken utterances by providing responsive user interface output (e.g., audible and/or visual user interface output), controlling smart device(s), and/or performing other action(s).

Automated assistants typically rely upon a pipeline of components in interpreting and responding to spoken utterances. For example, an automatic speech recognition (ASR) engine can process audio data that correspond to a spoken utterance of a user to generate ASR output, such as a transcription (i.e., sequence of term(s) and/or other token(s)) of the spoken utterance. Further, a natural language understanding (NLU) engine can process the ASR output to generate NLU output, such as an intent of the user in providing the spoken utterance and optionally slot value(s) for parameter(s) associated with the intent. Moreover, a fulfillment engine can be used to process the NLU output, and to generate fulfillment output, such as a structured request to obtain responsive content to the spoken utterance.

In some cases, this pipeline of components can be bypassed. For example, some machine learning (ML) models (also referred to as "warm word models") can be trained to detect particular words and/or phrases (also referred to as "warm words") that are mapped directly to fulfillment output. For instance, if a user is listening to music and provides a spoken utterance of "volume up", one or more of these ML models can process the audio data, and generate a structured request that causes the volume of the device playing the music to be turned up without generating any ASR output and/or NLU output. However, these warm words are typically common words and/or phrases that may occur in everyday speech. As a result, assistant commands associated with these warm words may be unintentionally triggered by users, thereby wasting computational resources. Further, in some of these cases, the user may have to undo some of these assistant commands, thereby wasting further computational resources.

SUMMARY

Implementations disclosed herein are directed to contextually suppressing performance (or execution) of assistant commands that are associated with one or more particular words and/or phrases (e.g., a warm word) based on contextual audio data and/or an identity of a user that provided a spoken utterance that includes one or more of the particular words and/or phrases. Some implementations process, using one or more warm word models, a stream of audio data to determine a portion of the audio data that corresponds to the particular word(s) and/or phrase(s) associated with an assistant command. Some of these implementations process, using an automatic speech recognition (ASR) model, a preamble portion of the audio data (e.g., a portion of the audio data that precedes the portion of the audio data corresponding to one or more of the particular words and/or phrases) and/or a postamble portion of the audio data (e.g., a portion of the audio data that follows the portion of the audio data corresponding to one or more of the particular words and/or phrases) to generate ASR output. Moreover, some of these implementations determine, based on processing the ASR output, whether a user that provided a spoken utterance captured in the audio data intended the assistant command, that is associated with one or more of the particular words or phrases, to be performed. Additional or alternative implementations can process the stream of audio data using a speaker identification (SID) model to determine whether the audio data is sufficient to identify the user that provided the spoken utterance captured in the stream of audio data, and determine if the user that provided the spoken utterance is authorized to cause performance of the assistant command.

For example, assume a phone call is received at a client device of a user. Further assume that the user of the client device provides a spoken utterance of "answer" in response to the phone call being received at the client device. In this example, and assuming "answer" is a warm word associated with an assistant command that causes an automated assistant implemented at least in part at the client device cause to answer the phone call, the automated assistant can answer the phone call on behalf of the user based on detecting an occurrence of the warm word "answer" using one or more warm word models. In contrast, assume that the user of the client device instead provides a spoken utterance of "I don't want to answer that" in response to the phone call being received at the client device. In this example, the automated assistant can process the contextual audio data to determine that the automated assistant should not answer the phone call on behalf of the user despite detecting the occurrence of the warm word of "answer" using one or more of the warm word models.

In some implementations, one or more automated assistant components that utilize one or more of the warm word models can be activated in response to detecting an occurrence of a warm word activation event. The warm word activation event can include, for example, a phone call being received at a client device, a text message being received at a client device, an email being received at a client device, an alarm or timer sounding at a client device, media being played at a client device or an additional client device in an environment of the client device, a notification being received at a client device, a location of a client device, a software application being accessible at a client device, and/or other events associated with a client device in which the user can provide a spoken utterance to cause the client device, or an additional client device in communication with the client device, to be controlled. Notably, some of these warm word activation events are discrete events (e.g., a phone call being received at the client device, a text message being received at a client device, an email being received at a client device, an alarm or timer sounding at a client device, etc.), whereas some other of these warm word activation events are continuous events (e.g., a software application being accessible at a client device). For example, assume a phone call is being received at the client device. In this example, one or more automated assistant components that utilize warm word model(s) associated with the phone call event can be activated while the phone is ringing and deactivated after the phone stops ringing. As another example, assume a text message is received at the client device. In this example, one or more automated assistant components that utilize warm word model(s) associated with the text message event can be activated when the text message is received and a duration of time after the text message is received (e.g., for 15 seconds, for 30 seconds, for 10 minutes, etc.). Moreover, it should be noted that these warm word activation events are not mutually exclusive. Put another way, one or more automated assistant components can actively monitor for warm words that are based on multiple disparate warm word activation events at a given instance of time.

The warm word models described herein can include a plurality of disparate warm word models (e.g., audio keyword classification model(s)) that are trained to detect one or more particular words and/or phrases (e.g., warm words) that, when detected, cause the automated assistant to perform an assistant command that is associated with one or more of the particular words and/or phrases. In some implementations, a given warm word model can be trained to detect a particular subset of words and/or phrases that are associated with a given warm word activation event. For example, assume that music is playing at the client device or another client device in communication with the client device (e.g., a smart speaker). In this example, a given warm word model can be trained to detect a subset of particular words and/or phrases that cause assistant commands associated with controlling the music to be performed, such as a "pause" warm word that may cause the music to be paused, a "resume" warm word that may cause the music to be resumed after being paused, a "volume up" warm word that may cause a volume of the music to be turned up, a "volume down" warm word that may cause a volume of the music to be turned down, a "next" warm word that may cause the music to skip to a next song, and so on for other particular words and/or phrases associated with the music. Accordingly, in this example, one or more of the currently dormant assistant functions that utilize the given warm word model can be activated in response to determining that the music is playing at the client device or another client device in communication with the client device.

In additional or alternative implementations, multiple warm word models can be trained to detect the subset of words and/or phrases that are associated with a given warm word activation event. Continuing with the above example, a first warm word model can be trained to detect one or more first particular words and/or phrases, such as the "pause" warm word and the "resume" warm word, a second warm word model can be trained to detect one or more second particular words and/or phrases, such as the "volume up" warm word and the "volume down" warm word, a third warm word model can be trained to detect one or more third particular words and/or phrases, such as the "next" warm word, and so on for other particular words and/or phrases associated with the music warm word activation event. Accordingly, in this example, one or more of the currently dormant assistant functions that utilize at least the first warm word model, the second warm word model, and the third warm word model can be activated in response to determining that the music is playing at the client device or another client device in communication with the client device.

In some implementations, and in response to one or more of the particular words and/or phrases being detected in the stream of audio data, the preamble portion of the audio data and/or the postamble portion of the audio data can be processed to determine whether the user that provided the spoken utterance did, in fact, intend for the assistant command associated with the detected one or more of the particular words and/or phrases to be performed. For example, again assume a phone call is received at a client device of a user, and assume that the user of the client device provides a spoken utterance of "I don't want to answer that" in response to the phone call being received at the client device. In this example, the preamble portion of the audio data (e.g., corresponding to "I don't want to") can be obtained from an audio buffer of the client device, and can be processed, using an ASR model, to generate ASR output. Further, the ASR output can be processed, using an NLU model, to generate NLU output. In this example, the ASR output and/or the NLU output indicate that the user did not intend "answer" to cause the automated assistant to answer the phone call on behalf of the user. In some versions of those implementations, the portion of the audio data that corresponds to the one or more particular words and/or phrases (e.g., corresponding to "answer") can additionally or alternatively be processed, and along with the preamble portion of the audio data, to generate the ASR output and the NLU output. In some versions of those implementations, the postamble portion of the audio data (e.g., corresponding to "that") can additionally or alternatively be processed, and along with the preamble portion of the audio data and/or the portion of the audio data that corresponds to one or more of the particular words and/or phrases, to generate the ASR output and the NLU output.

In some versions of those implementations, one or more currently dormant automated assistant components that utilize the ASR model and/or the NLU model can be activated in response to detecting additional voice activity that is in addition to one or more of the particular words and/or phrases. For example, the stream of audio data can be processed, using a voice activity detection (VAD) model, to determine if there is any additional voice activity. In implementations where the additional voice activity is detected, one or more of the currently dormant automated assistant components that utilize the ASR model and/or the NLU model can be activated to process the preamble portion of the audio data, the portion of the audio data that corresponds to one or more of the particular words and/or phrases, and/or the postamble portion of the audio data. In implementations where no additional voice activity is detected, one or more of the currently dormant automated assistant components that utilize the ASR model and/or the NLU model can be kept dormant, and the assistant command that is associated with one or more of the particular words and/or phrases can be performed.

In various implementations, an identity of the user that provided the spoken utterance must be verified prior to performance of the assistant command. For example, assistant commands associated with particular warm word activation events, particular devices, and/or particular software applications may require that the identity of the user be verified. For instance, in implementations where the assistant command causes the automated assistant to respond to an electronic communication (e.g., a phone call, a text message, an email, a social media message, and/or other electronic communications), the user that provided the spoken utterance may need to be verified prior to the automated assistant responding to the electronic communication. Also, for instance, in implementations where the assistant command causes the automated assistant to control particular smart devices (e.g., smart locks, a smart oven, a smart garage door, etc.), the user that provided the spoken utterance may need to be verified prior to the automated assistant controlling the particular smart devices. However, some assistant commands may not require that an identity of the user be verified prior to performance of the assistant command. For instance, in implementations where the assistant command causes the automated assistant to control media (e.g., music, videos, television shows, and/or other media), the user that provided the spoken utterance may not need to be verified prior to the automated assistant responding to the electronic communication. Also, for instance, in implementations where the assistant command causes the automated assistant to control other particular smart devices (e.g., smart lights, a smart clock, etc.), the user that provided the spoken utterance may not need to be verified prior to the automated assistant controlling the particular smart devices.

As noted above, the stream of audio data can be processed, using a SID model, to verify an identity of the user that provided the spoken utterance. In some versions of those implementations, and assuming one or more previously generated text dependent (TD) speaker embeddings are accessible at the client device for one or more of the particular words and/or phrases for the user, the portion of the audio data that corresponds to one or more of the particular words and/or phrases can be processed, using a TD SID model, to generate a TD speaker embedding. The generated TD speaker embedding can be effectively compared to one or more of the previously generated TD speaker embeddings for the user that are accessible at the client device to determine whether the spoken utterance is from an authorized user. Notably, the one or more particular words and/or phrases in TD SID can be constrained to one or more invocation phrases configured to invoke the automated assistant (e.g., hot words and/or trigger words such as, for example, "Hey Assistant", "OK Assistant", and/or "Assistant") or one or more warm words described herein.

In some additional or alternative versions of those implementations, and assuming one or more previously generated text independent (TI) speaker embeddings are accessible at the client device for the user, the audio data that corresponds to spoken utterance in the stream of audio data can be processed, using a TI SID model, to generate a TI speaker embedding. The generated TI speaker embedding can be effectively compared to one or more of the previously generated TI speaker embeddings for the user that are accessible at the client device to determine whether the spoken utterance is from an authorized user. Notably, in TD SID, the TI one or more previously generated TI speaker embeddings may not be constrained to one or more invocation phrases configured to invoke the automated assistant (e.g., hot words and/or trigger words such as, for example, "Hey Assistant", "OK Assistant", and/or "Assistant") or one or more warm words described herein.

Accordingly, in some versions of these implementations, a length of the spoken utterance captured in the stream of audio data can be compared to a length threshold to determine whether the spoken utterance is of a sufficient length to perform TI SID. If the length of the spoken utterance is sufficient to perform TI SID, then the audio data corresponding to the spoken utterance can be processed using the TI SID model and/or the TD SID model in an attempt to verify the identity of the user. However, even if the length of the spoken utterance is insufficient to perform TI SID, the audio data corresponding to the spoken utterance can still be processed using the TD SID model in an attempt to verify the identity of the user. Assuming the length of the spoken utterance is insufficient to perform TI SID (and/or TI SID is insufficient to verify the identity of the user), and assuming TD SID is insufficient to verify the identity of the user, a prompt that includes an example utterance can be provided for presentation to the user, where the example utterance is a sufficient length (or long enough) to perform TI SID or corresponds to a particular term and/or phrase for which one or more previously generated TD speaker embeddings are available. Additionally, or alternatively, the prompt can request the user provide other forms of biometric identification (e.g., faceprint verification and/or fingerprint identification) to cause the assistant command to be performed.

By using techniques described herein, one or more technical advantages can be achieved. As one non-limiting example, the techniques described herein enable the automated assistant to determine, based on processing contextual audio data for a warm word, whether a user does, in fact, intend an occurrence of a warm word to cause performance of an assistant command. As a result, a quantity of false positives of warm words can be reduced, thereby conserving computational resources at the client device and/or network resources in instances where the automated assistant utilizes one or more networks in causing assistant commands to be performed. Further, a quantity of user inputs can be reduced since a user of the client device need not take action to correct or undo any assistant commands, thereby conserving computational resources at the client device. Moreover, various automated assistant functions described herein can remain dormant until needed as described herein, thereby conserving computational resources at the client device. As another non-limiting example, the techniques described herein enable the automated assistant to verify an identity of a user that provides a spoken utterance including a warm word using SID and/or other techniques. As a result, only authorized users can cause certain assistant commands to be performed, thereby increasing data security of data associated with a user of the client device.

The above description is provided as an overview of only some implementations disclosed herein. Those implementations, and other implementations, are described in additional detail herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
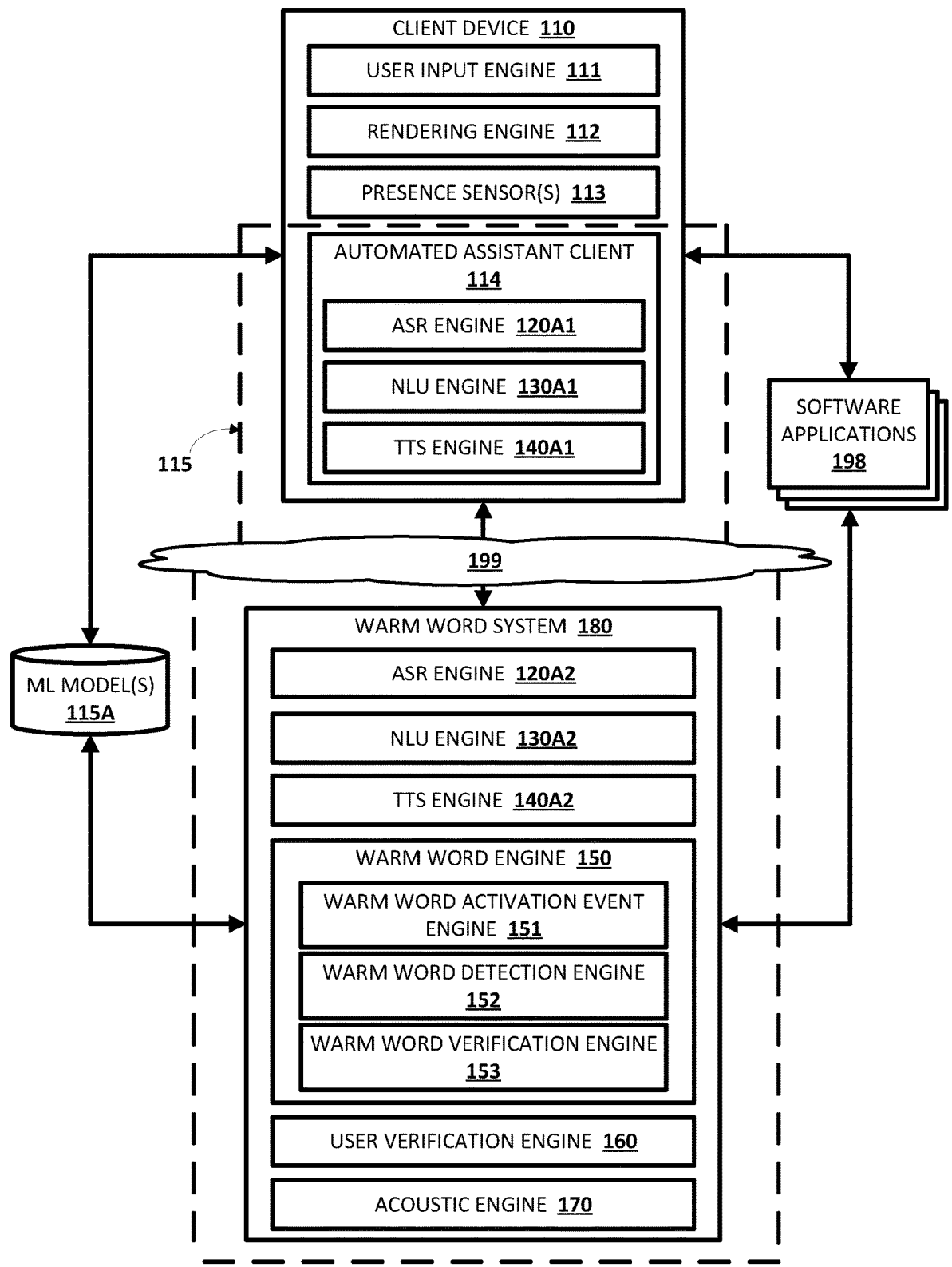
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a warm word system 180. In some implementations, the warm word system 180 can be implemented locally at the client device 110. In additional or alternative implementations, the warm word system 180 can be implemented remotely from the client device 110 as depicted in FIG. 1. In these implementations, the client device 110 and the warm word system 180 may be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an automated assistant client 114. An instance of the automated assistant client 114 can be an application that is separate from an operating system of the client device 110 (e.g., installed "on top" of the operating system)—or can alternatively be implemented directly by the operating system of the client device 110. The automated assistant client 114 can interact with the warm word system 180 implemented locally at the client device 110 or via one or more of the networks 199 as depicted in FIG. 1. The automated assistant client 114 (and optionally by way of its interactions with other remote system (e.g., server(s))) may form what appears to be, from a user's perspective, a logical instance of an automated assistant 115 with which the user may engage in a human-to-computer dialog. An instance of the automated assistant 115 is depicted in FIG. 1, and is encompassed by a dashed line that includes the automated assistant client 114 of the client device 110 and the warm word system 180. It thus should be understood that a user that engages with the automated assistant client 114 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 114 executing on the client device 110 and/or one or more servers that may implement the warm word system 180.

In various implementations, the client device 110 may include a user input engine 111 that is configured to detect user input provided by a user of the client device 110 using one or more user interface input devices. For example, the client device 110 may be equipped with one or more microphones that capture audio data, such as audio data corresponding to spoken utterances of the user or other sounds in an environment of the client device 110. Additionally, or alternatively, the client device 110 may be equipped with one or more vision components that are configured to capture vision data corresponding to images and/or movements (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

In various implementations, the client device 110 may include a rendering engine 112 that is configured to provide content for audible and/or visual presentation to a user of the client device 110 using one or more user interface output devices. For example, the client device 110 may be equipped with one or more speakers that enable content to be provided for audible presentation to the user via the client device 110. Additionally, or alternatively, the client device 110 may be equipped with a display or projector that enables content to be provided for visual presentation to the user via the client device 110.

In various implementations, the client device 110 may include one or more presence sensors 113 that are configured to provide, with approval from corresponding user(s), signals indicative of detected presence, particularly human presence. In some of those implementations, the automated assistant 115 can identify the client device 110 (or another computing device associated with a user of the client device 110) to satisfy a spoken utterance based at least in part of presence of the user at the client device 110 (or at another computing device associated with the user of the client device 110). The spoken utterance can be satisfied by rendering responsive content (e.g., via the rendering engine 112) at the client device 110 and/or other computing device(s) associated with the user of the client device 110, by causing the client device 110 and/or other computing device(s) associated with the user of the client device 110 to be controlled, and/or by causing the client device 110 and/or other computing device(s) associated with the user of the client device 110 to perform any other action to satisfy the spoken utterance. As described herein, the automated assistant 115 can leverage data determined based on the presence sensors 113 in determining the client device 110 (or other computing device(s)) based on where a user is near or was recently near, and provide corresponding commands to only the client device 110 (or those other computing device(s)). In some additional or alternative implementations, the automated assistant 115 can leverage data determined based on the presence sensors 113 in determining whether any user(s) (any users or specific users) are currently proximal to the client device 110 (or other computing device(s)), and can optionally suppress provision of data to and/or from the client device 110 (or other computing device(s)) based on the user(s) that are proximal to the client device 110 (or other computing device(s)).

The presence sensors 113 may come in various forms. For example, the client device 110 can utilize one or more of the user interface input components described above with respect to the user input engine 111 to detect presence of the user. Additionally, or alternatively, the client device 110 may be equipped with other types of light-based presence sensors 113, such as passive infrared ("PIR") sensors that measure infrared ("IR") light radiating from objects within their fields of view.

Additionally, or alternatively, in some implementations, the presence sensors 113 may be configured to detect other phenomena associated with human presence or device presence. For example, in some embodiments, the client device 110 may be equipped with a presence sensor 113 that detects various types of wireless signals (e.g., waves such as radio, ultrasonic, electromagnetic, etc.) emitted by, for instance, other computing devices carried/operated by a user (e.g., a mobile device, a wearable computing device, etc.) and/or other computing devices. For example, the client device 110 may be configured to emit waves that are imperceptible to humans, such as ultrasonic waves or infrared waves, that may be detected by other computing device(s) (e.g., via ultrasonic/infrared receivers such as ultrasonic-capable microphones).

Additionally, or alternatively, the client device 110 may emit other types of human-imperceptible waves, such as radio waves (e.g., Wi-Fi, Bluetooth, cellular, etc.) that may be detected by other computing device(s) carried/operated by a user (e.g., a mobile device, a wearable computing device, etc.) and used to determine the user's particular location. In some implementations, GPS and/or Wi-Fi triangulation may be used to detect a person's location, e.g., based on GPS and/or Wi-Fi signals to/from the client device 110. In other implementations, other wireless signal characteristics, such as time-of-flight, signal strength, etc., may be used by the client device 110, alone or collectively, to determine a particular person's location based on signals emitted by the other computing device(s) carried/operated by the user.

Additionally, or alternatively, in some implementations, the client device 110 may perform speaker identification (SID) to recognize a user from their voice (e.g., described with respect to user verification engine 160). In some implementations, movement of the speaker may then be determined, e.g., by the presence sensors 113 of the client device 110 (and optionally GPS sensors, *Soli* chips, and/or accelerometers of the client device 110). In some implementations, based on such detected movement, a location of the user may be predicted, and this location may be assumed to be the user's location when any content is caused to be rendered at the client device 110 and/or other computing device(s) based at least in part on proximity of the client device 110 and/or other computing device(s) to the user's location. In some implementations, the user may simply be assumed to be in the last location at which he or she engaged with the automated assistant 115, especially if not much time has passed since the last engagement.

Further, the client device 110 and/or the warm word system 180 may include one or more memories for storage of data and/or software applications 198, one or more processors for accessing data and executing the software applications 198, and/or other components that facilitate communication over one or more of the networks 199. In some implementations, one or more of the software applications 198 can be installed locally at the client device 110, whereas in other implementations one or more of the software applications 198 can be hosted remotely (e.g., by one or more servers) and can be accessible by the client device 110 over one or more of the networks 199. The operations performed by the client device 110, other computing device(s), and/or by the automated assistant 115 may be distributed across multiple computer systems. The automated assistant 115 may be implemented as, for example, computer programs running on the client device 110 and/or one or more computers in one or more locations that are coupled to each other through a network (e.g., the network(s) 199 of FIG. 1).

In some implementations, the operations performed by the automated assistant 115 may be implemented locally at the client device 110 via the automated assistant client 114. As shown in FIG. 1, the automated assistant client 114 may include an automatic speech recognition (ASR) engine 120A1, a natural language understanding (NLU) engine 130A1, and a text-to-speech (TTS) engine 140A1. In some implementations, the operations performed by the automated assistant 115 may be distributed across multiple computer systems, such as when the warm word system 180 is implemented remotely from the client device 110 as depicted in FIG. 1. In these implementations, the automated assistant 115 may additionally or alternatively utilize ASR engine 120A2, NLU engine 130A2, and TTS engine 140A2 of the warm word system 180.

Each of these engines may be configured to perform one or more functions. For example, the ASR engine 120A1 and/or 120A2 can process, using ASR model(s) stored in machine learning (ML) model(s) database 115A (e.g., a recurrent neural network (RNN) model, a transformer model, and/or any other type of ML model capable of performing ASR), audio data that captures spoken utterances and that is generated by microphone(s) of the client device 110 to generate ASR output. Further, the NLU engine 130A1 and/or 130A2 can process, using NLU model(s) stored in the ML model(s) database 115A (e.g., a long short-term memory (LSTM), gated recurrent unit (GRU), and/or any other type of RNN or other ML model capable of performing NLU) and/or grammar-based rule(s), the ASR output to generate NLU output. Moreover, the TTS engine 140A1 and/or 140A2 can process, using TTS model(s) stored in the ML model(s) database 115A, textual data (e.g., text formulated by the automated assistant 115) to generate synthesized speech audio data that includes computer-generated synthesized speech.

In various implementations, the ASR output can include, for example, one or more speech hypotheses (e.g., term hypotheses and/or transcription hypotheses) that are predicted to correspond to the spoken utterance of the user that is captured in the audio data, one or more corresponding predicted values (e.g., probabilities, log likelihoods, and/or other values) for each of the one or more speech hypotheses, a plurality of phonemes that are predicted to correspond to the spoken utterance of the user that is captured in the audio data, and/or other ASR output. In some versions of those implementations, the ASR engine 120A1 and/or 120A2 can select one or more of the speech hypotheses as recognized text that corresponds to the spoken utterance (e.g., based on the corresponding predicted values).

In various implementations, the NLU output can include, for example, annotated recognized text that includes one or more annotations of the recognized text for one or more (e.g., all) of the terms of the recognized text. For example, the NLU engine 130A1 and/or 130A2 may include a part of speech tagger (not depicted) configured to annotate terms with their grammatical roles. Additionally, or alternatively, the NLU engine 130A1 and/or 130A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. Additionally, or alternatively, the NLU engine 130A1 and/or 130A2 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 130A1 and/or 130A2 may rely on annotations from one or more other components of the NLU engine 130A1 and/or 130A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household).

As described herein, the automated assistant 115 can determine whether to cause an assistant command to be performed in response to detecting a warm word in a stream of audio data based on contextual audio data and/or based on an identity of a speaker that provided a spoken utterance captured in the stream of audio data. In making this determination, the automated assistant can utilize warm word engine 150, user verification engine 160, and/or acoustic engine 170. In various implementations, and as depicted in FIG. 1, the warm word engine 150 can include warm word activation event engine 151, warm word detection engine 152, and warm word verification engine 153.

In some implementations, the warm word activation event engine 151 can monitor for an occurrence of a warm word activation event. The warm word activation event can include, for example, a phone call being received at the client device 110, a text message being received at the client device 110, an email being received at the client device 110, an alarm sounding at the client device 110, a timer sounding at the client device 110, media being played at the client device 110 or an additional client device in an environment of the client device 110, a notification being received at the client device 110, a location of the client device 110 (e.g., the user at home, work, etc.), a software application, of the one or more software applications 198, being accessible at the client device 110, and/or other events associated with the client device 110 in which the user can provide a spoken utterance to cause the client device 110, or an additional client device in communication with the client device 110, to be controlled based on the spoken utterance. In some versions of those implementations, and in response to detecting an occurrence of a warm word activation event, the warm word activation event engine 151 can cause one or more currently dormant automated assistant functions that utilize warm word model(s) stored in the ML model(s) database 115A to be activated (e.g., a low power digital signal processor (DSP), a central processing unit (CPU), etc.). The warm word model(s) can be trained to detect one or more particular words or phrases (also referred to herein as "warm words") that are each associated with an assistant command. The one or more particular words or phrases can be associated with the assistant command such that, when detected, the automated assistant 115 can cause a particular action to be performed without explicitly invoking the automated assistant 115 via invocation words or phrases (e.g., "Assistant", "Hey Assistant", etc.), invocation gestures, or other means for invoking the automated assistant 115. Put another way, the one or more particular words or phrases can be mapped to a particular intent, particular fulfillment data, and/or a particular software application of the one or more software applications 198 that are accessible at the client device 110, such that the automated assistant 115 can bypass utilization of various assistant components (e.g., the ASR engines 120A1 and/or 120A2, the NLU engines 130A1 and/or 130A1, and/or other automated assistant components) to cause performance of the assistant command that is associated with the one or more particular words or phrases.

In some further versions of those implementations, one or more of the currently dormant automated assistant functions that utilize the warm word model(s) can remain active until one or more conditions are satisfied. The one or more conditions can include, for example, lapsing of a threshold duration of time, detecting one or more of the particular words or phrases, determining the warm word activation event has concluded, and/or other conditions described herein. For example, assume the warm word activation event includes a timer sounding at the client device 110. In this example, one or more of the currently dormant automated assistant functions that utilize the warm word model(s) can remain active until the user provides a warm word to stop the sounding of the timer, until the user manually stops the timer, or until a threshold duration of time lapses (e.g., 10 seconds) even if the time is still sounding (e.g., timeout after 10 minutes). As another example, assume the warm word activation event includes a notification being received at the client device 110. In this example, one or more of the currently dormant automated assistant functions that utilize the warm word model(s) can remain active until the user provides a warm word to interact with the notification, until the user manually dismisses the notification, or until a threshold duration of time (e.g., 30 seconds, 60 seconds, etc.) lapses. As yet another example, assume the warm word activation event includes a phone call being received at the client device 110. In this example, one or more of the currently dormant automated assistant functions that utilize the warm word model(s) can remain active until the user provides a warm word to interact with the phone call or until the phone call stops ringing. Accordingly, it should be understood that, once activated, one or more of the currently dormant automated assistant functions that utilize the warm word model(s) described herein can be activated for static or dynamic durations of time based on the warm word activation event detected and/or how the user of the client device 110 responds to the warm word activation event.

In additional or alternative implementations, one or more of automated assistant functions that utilize the warm word model(s) can always be active. Put another way, some of the automated assistant functions that utilize the warm word model(s) are always active regardless of whether a warm word activation event is detected by the warm word activation event engine 151. For example, one or more of automated assistant functions that utilize warm word model(s) to detect particular words or phrases associated with particular queries, such as "what's the weather", "what's on my calendar", etc., particular words or phrases associated with particular assistant routines, such as a "good morning" routine, a "good night" routine, etc., particular words or phrases associated with particular devices, such as "turn on the lights", "turn on the [room/light identifier] lights", etc., particular words or phrases associated with particular software applications that are in a launched or unlaunched state, of the one or more software applications 198 accessible at the client device 110, such as "open first application", "launch first application", "directions to 123 Main St." when a navigation application is in a launched or unlaunched state, "cheese" when a camera application is in a launched state, etc., and/or other particular words or phrases.

In some implementations, one or more warm word activation events can be defined with varying degrees of granularity. For example, assume the user of the client device 110 is listening to music at the client device 110. In this example, one or more automated assistant components that utilize a first warm word model to detect a first set of media control commands can be activated. For instance, the first warm word model can be utilized to detect an occurrence of "volume up", "volume down", "stop", and "resume". Further, when a next song begins playing at the client device 110, one or more automated assistant components that utilize a second warm word model to detect a second set of media control commands can be activated. For instance, the second warm word model can be utilized to detect an occurrence of "skip song" for the first ten seconds after the next song begins playing.

The warm word model(s) described herein can include a plurality of disparate warm word models (e.g., audio keyword classification model(s)) that are trained to detect one or more particular words or phrases (e.g., warm words) that, when detected, cause the automated assistant 115 to perform an assistant command that is associated with one or more of the particular words or phrases. In some implementations, a given warm word model can be trained to detect a particular subset of words or phrases that are associated with a given warm word activation event. For example, assume that music is playing at the client device 110 or another client device in communication with the client device 110. In this example, a given warm word model can be trained to detect a subset of particular words or phrases that cause assistant commands associated with controlling the music to be performed, such as a "pause" warm word that may cause the music to be paused, a "resume" warm word that may cause the music to be resumed after being paused, a "volume up" warm word that may cause a volume of the music to be turned up, a "volume down" warm word that may cause a volume of the music to be turned down, a "next" warm word that may cause the music to skip to a next song, and so on for other particular words or phrases associated with the music. Accordingly, in this example, one or more of the currently dormant assistant functions that utilize the given warm word model can be activated in response to determining that the music is playing at the client device 110 or another client device in communication with the client device 110. Thus, at a single instance of time, one or multiple warm word models may be active at the client device 110.

In additional or alternative implementations, multiple warm word models can be trained to detect the subset of words or phrases that are associated with a given warm word activation event. Continuing with the above example, a first warm word model can be trained to detect one or more first particular words or phrases, such as the "pause" warm word and the "resume" warm word, a second warm word model can be trained to detect one or more second particular words or phrases, such as the "volume up" warm word and the "volume down" warm word, a third warm word model can be trained to detect one or more third particular words or phrases, such as the "next" warm word, and so on for other particular words or phrases associated with the music. Accordingly, in this example, one or more of the currently dormant assistant functions that utilize at least the first warm word model, the second warm word model, and the third warm word model can be activated in response to determining that the music is playing at the client device 110 or another client device in communication with the client device 110.

The warm word model(s) described herein can be trained based on a plurality of training instances. Each of the plurality of training instances can include training instance input and training instance output. The training instance input can include audio data, where a portion of the audio data corresponds to one or more of the particular words or phrases that a given warm word model is being trained to detect, and the training instance output can include ground truth output, where the ground truth output includes an indication of whether the audio data of the training instance input includes one or more of the particular words or phrases that the given warm word model is being trained to detect. For example, in training the given warm word model in the above example described with respect to the music playing, training instance input, for a given training instance, can include audio data that corresponds to "turn the volume up", and training instance output, for the given training instance, can include ground truth output that indicates the audio data includes one or more of the particular words or phrases (e.g., "volume up"). The training instance input can be applied as input to the given warm word model to generate predicted output (e.g., a value, such as a probability, log likelihood, binary value, or other values) that is indicative of a likelihood of whether the training instance input includes one or more of the particular words or phrases. The predicted output can be compared to the ground truth output (e.g., a value that indicates the audio data of the training instance input does, in fact, include one or more of the particular words or phrases, such as a value of "1" in this example) of the training instance input to generate one or more losses, and the given warm word model can be updated based on one or more of the losses. In this example, the given training instance can be considered a positive training instance because the training instance input includes the portion of the audio data that the given warm word model is being trained to detect. Further, in this example, the given warm word model can optionally be additionally trained based on negative training instances, or training instances having training instance input corresponding to audio data that does not include one or more of the particular words or phrases that the given warm word model is being trained to detect.

For example, in training the given warm word model in the above example described with respect to the music playing, training instance input, for a given training instance, can include audio data that corresponds to "turn on the lights", and training instance output, for the given training instance, can include ground truth output that indicates the audio data includes does not include one or more of the particular words or phrases (e.g., "volume up"). The training instance input can be applied as input to the given warm word model to generate predicted output (e.g., a value, such as a probability, log likelihood, binary value, or other values) that is indicative of a likelihood of whether the training instance input includes one or more of the particular words or phrases. The predicted output can be compared to the ground truth output (e.g., a value that indicates the audio data of the training instance input does, in fact, include one or more of the particular words or phrases, such as a value of "0" in this example) of the training instance input to generate one or more losses, and the given warm word model can be updated based on one or more of the losses. In this example, the given training instance can be considered a negative training instance because the training instance input does not include any portion of the audio data that the given warm word model is being trained to detect (e.g., "volume up" or any other audio corresponding to controlling the music).

In some implementations, and assuming one or more of the automated assistant functions that utilize warm word model(s) are active, the warm word detection engine 152 can process a stream of audio data generated by microphone(s) of the client device using the warm word model(s) to monitor for an occurrence of one or more particular words or phrases. For example, assume a text message is received at the client device 110. Further assume the warm word activation event engine 151 detects the text message being received at the client device 110 and activates one or more automated assistant components that utilize one or more warm word models for detecting particular words or phrases (e.g., "reply", "dismiss", "show me", etc.) for the warm word activation event of the text message being received at the client device 110 until one or more of the conditions are satisfied. In this example, further assume the user of the client device 110 provides a spoken utterance of "reply that I'll be there in five minutes". Accordingly, in processing the stream of audio data, the warm word detection engine 152 can detect that a portion of the audio data corresponds to an occurrence of the warm word "reply". In some implementations, the warm word detection engine 152 can cause can cause one or more additional currently active automated assistant components that utilize the ASR model(s) and/or the NLU model(s) (e.g., the ASR engine 120A1 and/or 120A2, the NLU engine 130A1 and/or 130A2, and/or other automated assistant components) to be activated in response to detecting the occurrence of the warm word.

As described in more detail below (e.g., with respect to FIGS. 2, 3, and 4A-4C), the ASR engine 120A1 and/or 120A2 can process, using the ASR model(s) stored in the ML model(s) database 115A, the portion of the audio data that corresponds the occurrence of the warm word, a preamble portion of the audio data the precedes the portion of the audio data that corresponds to the occurrence of the warm word (if any), and/or a postamble portion of the audio data that follows the portion of the audio data that corresponds to the occurrence of the warm word (if any) to generate ASR output. Further, the NLU engine 130A1 and/or 130A2 can process, using the NLU model(s) stored in the ML model(s) database 115A and/or grammar-based rule(s), the ASR output to generate NLU output. In some versions of those implementations, the ASR engine 120A1 and/or 120A2 can obtain one or more of these portions (e.g., the preamble portion of the audio data (if any) and/or the portion of the audio data corresponds to the occurrence of the warm word) from an audio buffer of the client device 110. In various implementations, the ASR output can be biased towards particular term(s) and/or phrases(s) that are associated with the warm word model(s). For example, if the warm word activation event corresponds to a media event (e.g., the user of the client device 110 is listening to music at the client device 110), then the ASR output can be biased towards music-related term(s) and/or phrase(s), such as artists, songs, genres of music, etc.

For example, the automated assistant 115 can cause the stream of audio data to be processed, using an endpointing model stored in the ML model(s) database 115A, to generate a plurality of timestamps for a spoken utterance that is captured in the stream of audio data. The plurality of timestamps can include at least a first timestamp associated with a first time when the user began providing the spoken utterance, a second timestamp associated with a second time, that is subsequent to the first time, when the user began providing the one or more particular words or phrases included in the spoken utterance, a third timestamp associated with a third time, that is subsequent to the second time, when the user finished providing the one or more particular words or phrases included in the spoken utterance, and a fourth timestamp associated with a fourth time, that is subsequent to the third time, when the user finished providing the spoken utterance. In this example, the preamble portion of the audio data includes any audio data that corresponds to the spoken utterance between the first timestamp and the second timestamp, the portion of the audio data that includes any audio data that corresponds to the spoken utterance between the second timestamp and the third timestamp, and the postamble portion of the audio data includes any audio data that corresponds to the spoken utterance between the third timestamp and the fourth timestamp. It should be noted that this example is provided for illustrative purposes and is not meant to be limiting. For example, in some cases, such as when the spoken utterance only includes one or more of the particular words or phrases, the plurality of timestamps can include at least a first timestamp associated with a first time when the user began providing the spoken utterance, and a second timestamp associated with a second time, that is subsequent to the first time, when the user finished providing the spoken utterance. In this example, there may be no preamble portion of the audio data or postamble portion of the audio data.

In some implementations, the warm word verification engine 153 can process the ASR output to determine whether the user intended the one or more particular words or phrases to cause performance of the assistant command. For example, the warm word verification engine 153 can cause the NLU engine 130A1 and/or 130A2 to process, using the NLU model(s) stored in the ML model(s) database 115A or the grammar-based rules, the ASR output to generate NLU output. The warm word verification engine 153 can determine, based on the ASR output and/or the NLU output, whether the user intended the user intended the one or more particular words or phrases to cause performance of the assistant command. Continuing with the above example, in response to the warm word (e.g., that captures the spoken utterance "reply that I'll be there in five minutes"). Continuing with the above example, in response to an occurrence of the warm word (e.g., "reply") being detected in the stream of audio data, the ASR engine 120A1 and/or 120A2 and/or the NLU engine 130A1 and/or 130A2 can be activated and utilized to process the stream of audio data to generate ASR output for the stream of audio data (e.g., that captures the spoken utterance "reply that I'll be there in five minutes"). Further, the NLU engine 130A1 and/or 130A2 can process, using the NLU model(s) stored in the ML model(s) database 115A, the ASR output to generate NLU output. In this example, the warm word verification engine 153 can determine that "reply" was intended by the user to reply to the text message received at the client device 110 with a reply message of "I'll be there in five minutes".

In contrast with the above example, assume that the user of the client device 110 instead provided a spoken utterance of "I'll reply to that later" when the text message is received at the client device 110. In this example, the warm word activation event engine 151 can detect the occurrence of the warm word activation event (e.g., the text message being received at the client device) and cause one or more of the currently dormant automated assistant functions that utilize the warm word model to be activated. Further, the warm word detection engine 152, in processing the stream of audio data using one or more of the warm word models activated for the warm word activation event, can detect the occurrence of the one or more particular words or phrases (e.g., "reply") in a portion of the audio data in the same or similar manner described above. However, in this example, the automated assistant 115 can determine based on processing a postamble portion of the audio data using the ASR engine 120A1 and/or 120A2 and/or the NLU engine 130A1 and/or 130A2 (e.g., the postamble portion corresponding to "to that later") that the user did not intend "reply" to be a particular word or phrase that causes the automated assistant to reply to the received text message. Accordingly, in this example, the automated assistant 115 can refrain from causing performance of the assistant command of replying to the text message even though the user provided a spoken utterance included the one or more particular words or phrases (e.g., "reply") that typically cause the assistant command to be performed.

In additional or alternative implementations, the automated assistant 115 may only cause the assistant command to be performed if the user verification engine 160 determines that an identity of the user that provided the spoken utterance is verified and that the user that provided the spoken utterance is authorized to cause performance of the assistant command. In some versions of those implementations, only a subset of assistant commands may require that the identity of the user that provided the spoken utterance is verified and the user that provided the spoken utterance is authorized to cause performance of the assistant command. For example, assistant commands associated with a phone call warm word activation event, text message warm word activation event, and an email warm word activation event may require that the identity of the user that provided the spoken utterance is verified and the user that provided the spoken utterance is authorized to cause performance of the assistant commands. However, assistant commands associated with a media warm word activation event may not require that the identity of the user that provided the spoken utterance is verified and the user that provided the spoken utterance is authorized to cause performance of the assistant commands. The identity of the user that provided the spoken utterance can be verified using various techniques.

In some versions of those implementations, the user verification engine 160 can process, using speaker identification (SID) model(s) stored in the ML model(s) database 115A, the stream of audio data to generate a speaker embedding for the user that provided the spoken utterance. The generated speaker embedding can be compared, in embedding space, with one or more previously generated speaker embeddings for the user of the client device 110 (e.g., an embedding associated with a user profile of the user). For example, if a distance metric, determined based on the comparing in the embedding space, between the generated speaker embedding and the one or more previously generated speaker embeddings for the user satisfies a threshold, the user can be verified as the user that provided the spoken utterance. The one or more previously generated speaker embeddings for the user can be generated based on output(s) generated based on processing of one or more instances of audio data that includes spoken utterances that are from the user (e.g., when initially configuring the client device 110). For example, the one or more previously generated speaker embeddings can be based on an average (or other combination) of a plurality of different embeddings that are each generated based on processing of a corresponding instance of audio data that includes a corresponding spoken utterance from the user of the client device. In some versions of those implementations, the SID model can be a text independent (TI) SID model, whereas in other implementations, the SID model can be a text dependent (TD) SID model.

In TD SID, the one or more previously generated speaker embeddings of the user are generated based on spoken utterances that include only one or more particular words or phrases. Moreover, in use, the user must speak the one or more particular words or phrases for one or more TD SID speaker embedding to be generated using the TD SID model, which can be effectively compared to one or more previously generated TD speaker embedding for the user to determine whether the spoken utterance is from an authorized user (e.g., the user of the client device 110 or another user associated with the client device 110). For example, the one or more particular words or phrases in TD speaker recognition can be constrained to one or more invocation phrases configured to invoke the automated assistant (e.g., hot words and/or trigger words such as, for example, "Hey Assistant", "OK Assistant", and/or "Assistant") or one or more warm words described herein. In contrast, in TI SID, the spoken utterance processed using the TI SID model is not constrained to the one or more particular words or phrases. In other words, audio data based on virtually any spoken utterances can be processed using the TI SID model to generate a TI SID speaker embedding, which can be effectively compared to one or more previously generated TI speaker embeddings for the user to determine whether the spoken utterance is from an authorized user (e.g., the user of the client device 110 or another user associated with the client device 110). Moreover, in various implementations, the one or more previously generated TI speaker embeddings of the user utilized in TI SID are generated based on spoken utterances that include disparate words and/or phrases and are not limited to invocation words and/or phrases, warm words, and/or any other particular spoken utterances.

In additional or alternative versions of those implementations, other biometric information can be utilized to verify the identity of the user that provided the spoken utterance.

The biometric information utilized to verify the identity of the user can include, for example, faceprint identification, fingerprint identification, and/or other types of biometric information. For example, vision components of the presence sensors 113 of the client device 110 can capture vision data that includes a face of the user that provided the spoken utterance. The user verification engine 160 can process, using a face identification (FID) model stored in the ML model(s) database 115A, the vision data to generate a faceprint of the user that provided the spoken utterance. The faceprint of the user that provided the spoken utterance can correspond to an embedding that can be compared, in embedding space, to one or more previously generated embeddings corresponding to a faceprint of the user of the client device to determine whether the user that provided the spoken utterance is authorized to cause performance of the assistant command. As another example, a fingerprint sensor of the presence sensors 113 can receive touch input of the user that provided the spoken utterance, and compare the detected fingerprint with a known fingerprint of the user of the client device 110 to determine whether the user that provided the spoken utterance is authorized to cause performance of the assistant command.

In additional or alternative implementations, the acoustic engine 170 can process the audio data to generate one or more acoustic characteristics associated with the audio data. In these implementations, the automated assistant 115 can additionally or alternatively consider one or more of the acoustic characteristics associated with the audio data in determining whether to cause the assistant command to be performed in response to detecting the warm word in the stream of audio data. The acoustic engine 170 can utilize various techniques to generate the one or more acoustic characteristics associated with the audio data.

In some versions of those implementations, the acoustic engine 170 can process, using a voice activity detection (VAD) model stored in the ML model(s) database 115A, the audio data to determine whether there is a preamble portion of audio data that precedes the portion of audio data that corresponds to the one or more particular words or phrases and/or a postamble portion of audio data that follows the portion of audio data that corresponds to the one or more particular words or phrases. In some further versions of these implementations, the ASR engine 120A1 and/or 120A2 and/or the NLU engine 130A1 and/or 130A2 may only be activated in response to determining that the preamble portion of the audio data and/or the postamble portion of the audio data exist. For example, assume that the user of the client device 110 provided a spoken utterance of "view" when a notification is received at the client device 110. In this example, the warm word activation event engine 151 can detect the occurrence of the warm word activation event (e.g., the notification being received at the client device) and cause one or more of the currently dormant automated assistant functions that utilize the warm word model to be activated. Further, the warm word detection engine 152, in processing the stream of audio data using one or more of the warm word models activated for the warm word activation event, can detect the occurrence of the one or more particular words or phrases (e.g., "view") in a portion of the audio data in the same or similar manner described above. However, the acoustic engine 170 can determine, based on processing the stream of audio data using the VAD model, that there is not preamble portion of the audio data (e.g., that precedes "view" in the stream of audio data) or postamble portion of the audio data (e.g., that follows "view" in the stream of audio data). As a result, the ASR engine 120A1 and/or 120A2 and/or the NLU engine 130A1 and/or 130A2 may not be activated, and the automated assistant 115 can cause the notification to be provided for presentation to the user (and optionally based on determining that the user is authorized to view the notification).

In additional or alternative versions of those implementations, the acoustic engine 170 can process, using a language identification model stored in the ML model(s) database 115A, the audio data to determine a language of a spoken utterance captured in the audio data. In some versions of these implementations, the language of the spoken utterance can provide an indication of which of a preamble portion of the audio data or a postamble portion of the audio data provides contextual information to inform the automated assistant 115 of whether to cause the assistant command that is associated with one or more of the particular words or phrases corresponding to the portion of the audio data, or to refrain from causing the assistant command that is associated with one or more of the particular words or phrases corresponding to the portion of the audio data to be performed. For example, in the English language, certain terms or phrases that are indicative of refraining from causing the assistant command tend to precede the portion of the audio data (e.g., in a preamble portion of the audio data) that corresponds to one or more of the particular words or phrases (e.g., "won't answer", "can't view", etc.). However, in other languages (e.g., the German language), certain terms or phrases that are indicative of refraining from causing the assistant command tend to follow the portion of the audio data (e.g., in a postamble portion of the audio data) that corresponds to one or more of the particular words or phrases.

In additional or alternative implementations, the language of the spoken utterance can provide an indication of which warm word model(s) and/or which ASR model(s) should be utilized to further process the stream of audio data. For example, assuming output generated across the language identification model indicates that the user that provided a spoken utterance captured in the stream of audio data is speaking the English language, the warm word model(s) and/or the ASR model(s) subsequently utilized by the automated assistant components can be specific to the English language. However, assuming output generated across the language identification model indicates that the user that provided a spoken utterance captured in the stream of audio data is speaking the German language (or another language), the warm word model(s) and/or the ASR model(s) subsequently utilized by the automated assistant components can be specific to the German language (or that other language). In additional or alternative implementations, warm word model(s) that are trained to detect one or more of the particular words and/or phrases in different languages can be utilized by one or more active automated assistant components, and which ASR model(s) should be subsequently utilized by one or more of the automated assistant components to further process the stream of audio data can be determined based on a language of the detected one or more of the particular words and/or phrases. For example, assuming output generated across the warm word model(s) indicates that the detected warm word was provided in the Spanish language, the ASR model(s) subsequently utilized by the automated assistant components can be specific to the Spanish language. However, assuming output generated across the warm word model(s) indicates that the detected warm word was provided in the English language (or another language), the ASR model(s) subsequently utilized by the automated assistant components can be specific to the English language (or that other language).

In additional or alternative versions of those implementations, the acoustic engine 170 can process, using a prosodic property classification model stored in the ML model(s) database 115A, the audio data to determine one or more prosodic properties of a spoken utterance captured in the stream of the audio data. The prosodic properties of the spoken utterance captured in the stream of audio data can include, for example, one or more of: intonation, tone, stress, rhythm, tempo, and pause. One or more of these prosodic properties can inform the automated assistant 115 of whether to cause the assistant command that is associated with one or more of the particular words or phrases corresponding to the portion of the audio data, or to refrain from causing the assistant command that is associated with one or more of the particular words or phrases corresponding to the portion of the audio data to be performed. For example, if a spoken utterance captured in the audio data does not include any pauses and additional stress is placed on one or more of the particular words or phrases, one or more of the prosodic properties of the spoken utterance can inform the automated assistant 115 it is more likely that the user intended the assistant command to be performed. In contrast, if the spoken utterance captured in the audio data does include pauses and an unsure tone, one or more of the prosodic properties of the spoken utterance can inform the automated assistant 115 it is more likely that the user did not intend the assistant command to be performed.

In additional or alternative implementations, the automated assistant 115 can analyze an instance of sensor data generated by one or more of the presence sensors 113. The automated assistant 115 considers the instance of the sensor data generated by one or more of the presence sensors 113 in determining whether to cause the assistant command to be performed in response to detecting the warm word in the stream of audio data. For example, if one or more vision components of the client device 110 indicate that a gaze of the user that provided the spoken utterance is not directed to the client device 110, then the vision data can inform the automated assistant 115 it is more likely that the user did not intend the assistant command to be performed. Additionally, or alternatively, if one or more accelerometers of the client device 110 indicate that the client device 110 is moving (and optionally coupled with the lack of the gaze of the user), then the vision data can inform the automated assistant 115 it is more likely that the user did not intend the assistant command to be performed.

Figure 2:
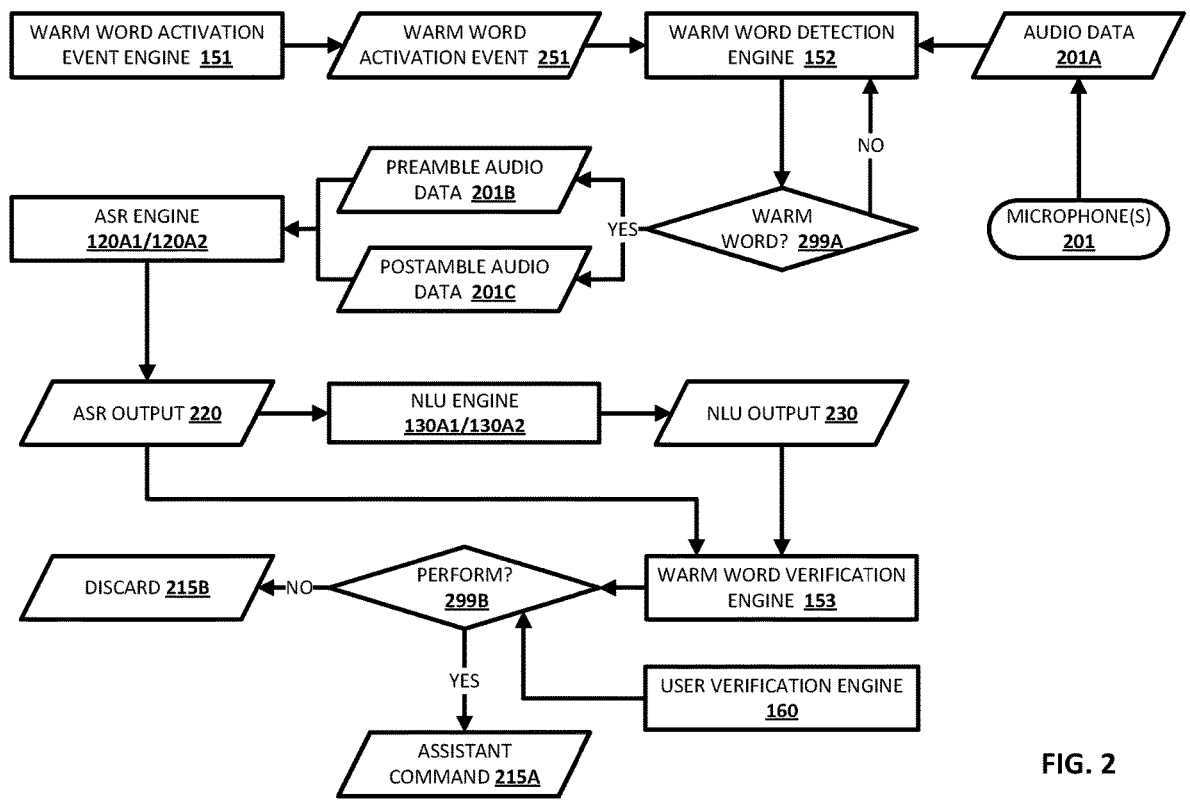
FIG. 2 depicts an example process flow that demonstrates various aspects of the present disclosure using various components of FIG. 1, in accordance with various implementations.

Turning now to FIG. 2, an example process flows that demonstrates various aspects of the present disclosure using various components of FIG. 1 is depicted. The warm word activation event engine 151 can monitor for an occurrence of a warm word activation event 251. In response to detecting the occurrence of the warm worm event, the warm word detection engine 152 can be activated and begin processing, using warm word model(s) associated with the warm word activation event 251 stored in the ML model(s) database 115A, a stream of audio data 201A generated by one or more microphones 201 of the client device 110. As indicated at block 299A, in response to determining that the audio data does not correspond to one or more warm words, the warm word detection engine 152 can continue monitoring for an occurrence of one or more of the warm words until one or more conditions are satisfied.

However, and as also indicated at block 299A, in response to determining that a portion of the audio data does correspond to one or more of the warm words, the warm word detection engine 152 can cause a preamble portion of the audio data 201B that precedes the portion of the audio data that corresponds one or more of the warm words (if any) and/or a postamble portion of the audio data 201C that follows the portion of the audio data that corresponds one or more of the warm words (if any) to be obtained. Further, and also in response to determining that a portion of the audio data does correspond to one or more of the warm words, the warm word detection engine 152 can cause the ASR engine 120A1 and/or 120A2 and/or the NLU engine 130A1 and/or 130A2 to be activated. The ASR engine 120A1 and/or 120A2 can process, using the ASR model(s) stored in the ML model(s) database 115A, the preamble portion of the audio data 201B and/or the postamble portion of the audio data 201C (and optionally the portion of the audio data that corresponds to one or more of the warm word) to generate ASR output 220 (e.g., recognized for any speech of the user included in the audio data). Moreover, the NLU engine 130A1 and/or 130A2 can process, using the NLU model(s) stored in the ML model(s) database 115A, the ASR output 220 to generate NLU output 230 (e.g., annotated recognized for any speech of the user included in the audio data). The warm word verification engine 153 can determine, based on the ASR output 220 and/or the NLU output 230, whether the user did, in fact, intend for the automated assistant 115 to cause performance of the assistant command.

For example, assume the audio data 201A captures a spoken utterance of "will you turn the volume up" while listening to music via the client device 110 or an additional client device in communication with the client device 110 (e.g., a smart speaker). In this example, the warm word activation event 251 can correspond to a media event, and the warm word "volume up" can be detected in audio data that captures the spoken utterance using one or more warm word models associated with the media event. Further, the ASR engine 120A1 and/or 120A2 can process, using the ASR model(s), the preamble portion of the audio data 201B that that corresponds to "will you turn the" and/or the portion of the audio data that corresponds to "volume up" to generate the recognized text (e.g., as the ASR output 220) corresponding to "will you turn the" and/or "volume up". Moreover, the NLU engine 130A1 and/or 130A2 can process, using the NLU model(s), the recognized text corresponding to "will you turn the" and/or "volume up" to generate annotated recognized text (e.g., as the NLU output 230) that annotates one or more terms of the recognized text with various annotations. In this example, and as indicated at block 299B, the automated assistant 115 can determine, based on the recognized text and/or the annotated recognized text, that an assistant command 215A of turning of the volume of the music that is playing should be performed, and cause the assistant command 215A to be performed (e.g., by turning up the volume at the client device 110 or transmitting a request to an additional client device in communication with the client device 110 to turn up the volume).

In contrast, assume the audio data 201A captures a spoken utterance of "please don't turn the volume up" while listening to music via the client device 110 or an additional client device in communication with the client device 110 (e.g., a smart speaker). In this example, the warm word activation event 251 can correspond to a media event, and the warm word "volume up" can be detected in audio data that captures the spoken utterance using one or more warm word models associated with the media event. Further, the ASR engine 120A1 and/or 120A2 can process, using the ASR model(s), the preamble portion of the audio data 201B that that corresponds to "please don't turn the" and/or the portion of the audio data that corresponds to "volume up" to generate the recognized text (e.g., as the ASR output 220) corresponding to "please don't turn the" and/or "volume up". Moreover, the NLU engine 130A1 and/or 130A2 can process, using the NLU model(s), the recognized text corresponding to "please don't turn the" and/or "volume up" to generate annotated recognized text (e.g., as the NLU output 230) that annotates one or more terms of the recognized text with various annotations. In this example, and as indicated at block 299B, the automated assistant 115 can determine, based on the recognized text and/or the annotated recognized text, that an assistant command of turning of the volume of the music that is playing should not be performed, and refrain from causing the assistant command to be performed. In some of these examples, the audio data 201A and/or any other data generated based on the audio data 201A may be discarded as indicated at 215B.

In some implementations, whether the automated assistant 115 determines to cause the assistant command to be performed can be based on whether an identity of the user that provided the spoken utterance is verified, and that the identified user is authorized to cause performance of the assistant command (e.g., determined using the user verification engine 160 as described with respect to FIGS. 1, 5, and 6A-6C). For example, in implementations where the warm word activation event corresponds to an electronic communication (e.g., phone call, text message, email, social media message, etc.) being received at the client device 110, the identity of the user may need to be performed prior to the automated assistant 115 causing the assistant command to be performed. As another example, in implementations where the warm word activation event corresponds to certain devices being controlled (e.g., smart locks, a smart appliance such as a smart oven, a smart garage door opener, etc.), the identity of the user may need to be performed prior to the automated assistant 115 causing the assistant command to be performed.

Although a particular implementation is described with respect to the process flow of FIG. 2, it should be understood that is for the sake of example and is not meant to be limiting. For example, assume the audio data 201A captures a spoken utterance of "show me directions home". In this example, the detected warm word activation event 251 may correspond to a navigation application being accessible at the client device 110. Accordingly, one or more warm word models associated with the navigation event may continuously monitor for an occurrence of one or more navigation related warm words. Moreover, the automated assistant can utilize additional or alternative signals in determining whether to cause the assistant command to be performed (e.g., as described with respect to the acoustic engine 170).

By using techniques described herein, one or more technical advantages can be achieved. As one non-limiting example, the techniques described herein enable the automated assistant to determine, based on processing contextual audio data for a warm word, whether a user does, in fact, intend an occurrence of a warm word to cause performance of an assistant command. As a result, a quantity of false positives of warm words can be reduced, thereby conserving computational resources at the client device and/or network resources in instances where the automated assistant utilizes one or more networks in causing assistant commands to be performed. Further, a quantity of user inputs can be reduced since a user of the client device need not take action to correct or undo any assistant commands, thereby conserving computational resources at the client device. Moreover, various automated assistant functions described herein can remain dormant until needed as described herein, thereby conserving computational resources at the client device. As another non-limiting example, the techniques described herein enable the automated assistant to verify an identity of a user that provides a spoken utterance including a warm word using SID and/or other techniques. As a result, only authorized users can cause certain assistant commands to be performed, thereby increasing data security of data associated with a user of the client device.

Figure 3:
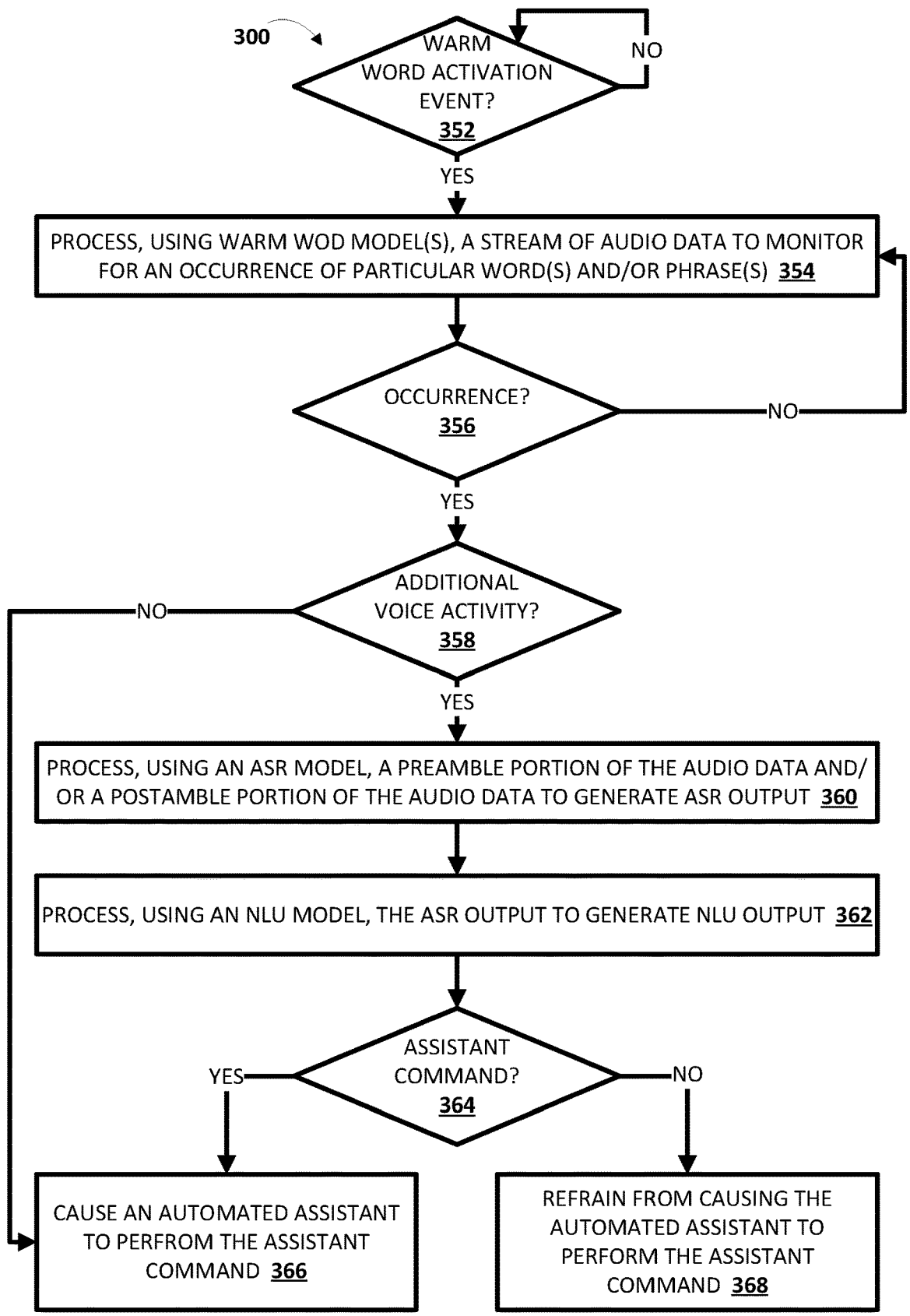
FIG. 3 depicts a flowchart illustrating an example method of determining whether to cause an assistant command to be performed based on contextual audio data, in accordance with various implementations.

Turning now to FIG. 3, a flowchart illustrating an example method 300 of determining whether to cause an assistant command to be performed based on contextual audio data is depicted. For convenience, the operations of the method 300 are described with reference to a system that performs the operations. This system of the method 300 includes one or more processors, memory, and/or other component(s) of computing device(s) (e.g., client device 110 of FIGS. 1, 4A-4C, and 6A-6C, and/or computing device 710 of FIG. 7, one or more servers, and/or other computing devices). Moreover, while operations of the method 300 are shown in a particular order, this is not meant to be limiting. One or more operations may be reordered, omitted, and/or added.

At block 352, the system monitors for an occurrence of a warm word activation event. The warm word activation event can include, for example, a phone call being received at a client device, a text message being received at a client device, an email being received at a client device, an alarm or timer sounding at a client device, media being played at a client device or an additional client device in an environment of the client device, a notification being received at a client device, a location of a client device, a software application being accessible at a client device, and/or other events associated with a client device in which the user can provide a spoken utterance to cause the client device, or an additional client device in communication with the client device, to be controlled. Notably, some of these warm word activation events are discrete events (e.g., a phone call being received at the client device, a text message being received at a client device, an email being received at a client device, an alarm or timer sounding at a client device, etc.), whereas some other of these warm word activation events are continuous events (e.g., a software application being accessible at a client device). Moreover, it should be noted that these warm word activation events are not mutually exclusive. Put another way, the system can detect multiple warm word activation events at a given instance of time. If, at an iteration of block 352, the system does not detect an occurrence of a warm word activation event, the system can continue monitoring for an occurrence of a warm word activation event at block 352. If, at an iteration of block 352, the system detects an occurrence of a warm word activation event, the system can proceed to block 354.

At block 354, the system processes, using one or more warm word models, a stream of audio data to monitor for an occurrence of one or more particular words and/or phrases (e.g., a warm word). In response to detecting the occurrence of the warm word activation event at block 352, the system can cause one or more automated assistant components that utilize the one or more warm worm models. The one or more warm word models utilized to process the stream of audio data can be associated with the warm word activation event detected at block 352. For example, if the warm word activation event detected at block 352 corresponds to a phone call being received at a client device, then one or more warm word models associated with the phone call event can be utilized to process the stream of audio data. As another example, if the warm word activation event detected at block 352 corresponds to media being played at a client device, then one or more warm word models associated with the media event can be utilized to process the stream of audio data.

At block 356, the system determines whether an occurrence of one or more of the particular word and/or phrases is detected in the stream of audio data. The system can continue monitoring an occurrence of one or more of the particular word and/or phrases until one or more conditions are satisfied. The one or more conditions can include, for example, lapsing of a threshold duration of time, detecting one or more of the particular words or phrases, determining the warm word activation event has concluded, and/or other conditions. If, at an iteration of block 356, the system does not detect an occurrence of one or more of the particular word and/or phrases, the system can return to block 354 and continue processing the stream of audio data and monitoring for an occurrence of one or more of the particular words and/or phrases at block 356 until one or more of the conditions are satisfied. If, at an iteration of block 356, the system does detect an occurrence of one or more of the particular word and/or phrases, the system proceeds to block 358.

At block 358, the system determines whether there is an additional voice activity that is in addition to the warm word (e.g., that precedes or follows the warm word). The system can process, using a VAD model, the stream of audio data to determine whether the stream of audio data captures any additional audio data that is in addition to a portion of the audio data corresponding to one or more of the particular words and/or phrases. Put another way, the system can utilize the VAD model to determine whether the user provided any additional speech that is in addition to one or more of the particular words and/or or phrases such that audio data corresponding to the additional speech can be utilized as contextual audio data (e.g., a preamble portion of the audio data and/or a postamble portion of the audio data) in interpreting one or more of the particular words and/or or phrases. If, at an iteration of block 358, the system determines there is not any additional voice activity that is in addition to the warm word, the system proceeds to block 366 and causes an automated assistant to perform an assistant command that is associated with one or more of the particular words and/or phrases. Notably, in proceeding to block 366, the system may bypass ASR and/or NLU. If, at an iteration of block 358, the system determines there is additional voice activity that is in addition to the warm word, the system proceeds to block 360. In some implementations, the operations of blocks 358 may be omitted, and the system may proceed directly to block 360.

At block 360, the system processes, using an ASR model, a preamble portion of the audio data and/or a postamble portion of the audio data to generate ASR output. The system can additionally or alternatively process, using the ASR model, and along with the preamble portion of the audio data and/or the postamble portion of the audio data (e.g., as a single instance of the audio data), a portion of the audio data that corresponds to the warm word in generating the ASR output. One or more automated assistant components that utilize the ASR model can be activated in response to detecting the occurrence of one or more of the particular words and/or phrases at block 356 and/or in response to determining there is additional voice activity at block 358. In various implementations, the ASR output can be biased towards one or more of the particular words and/or phrases associated with the warm word model(s). At block 362, the system processes, using an NLU model, the ASR output to generate NLU output. Similar to described above with respect to block 360, one or more automated assistant components that utilize the NLU model can be activated in response to detecting the occurrence of one or more of the particular words and/or phrases at block 356 and/or in response to determining there is additional voice activity at block 358.

At block 364, the system determines whether a user, that provided a spoken utterance that includes the warm word and that is captured in the stream of audio data, intended an assistant command, that is associated with the warm word detected at block 356, to be performed by an automated assistant. The system can determine whether the user intended the assistant command to be performed by the automated assistant based on the ASR output generated at block 360 and/or the NLU output generated at block 362. If, at an iteration of block 364, the system determines the user intended the assistant command to be performed by the automated assistant, the system proceeds to block 366. At block 366, the system causes an automated assistant to perform the assistant command that is associated with the warm word detected at block 356. If, at an iteration of block 364, the system determines the user did not intend the assistant command to be performed by the automated assistant, the system proceeds to block 368. At block 368, the system refrains from causing the automated assistant to perform the assistant command that is associated with the warm word detected at block 356.

Figure 4A:
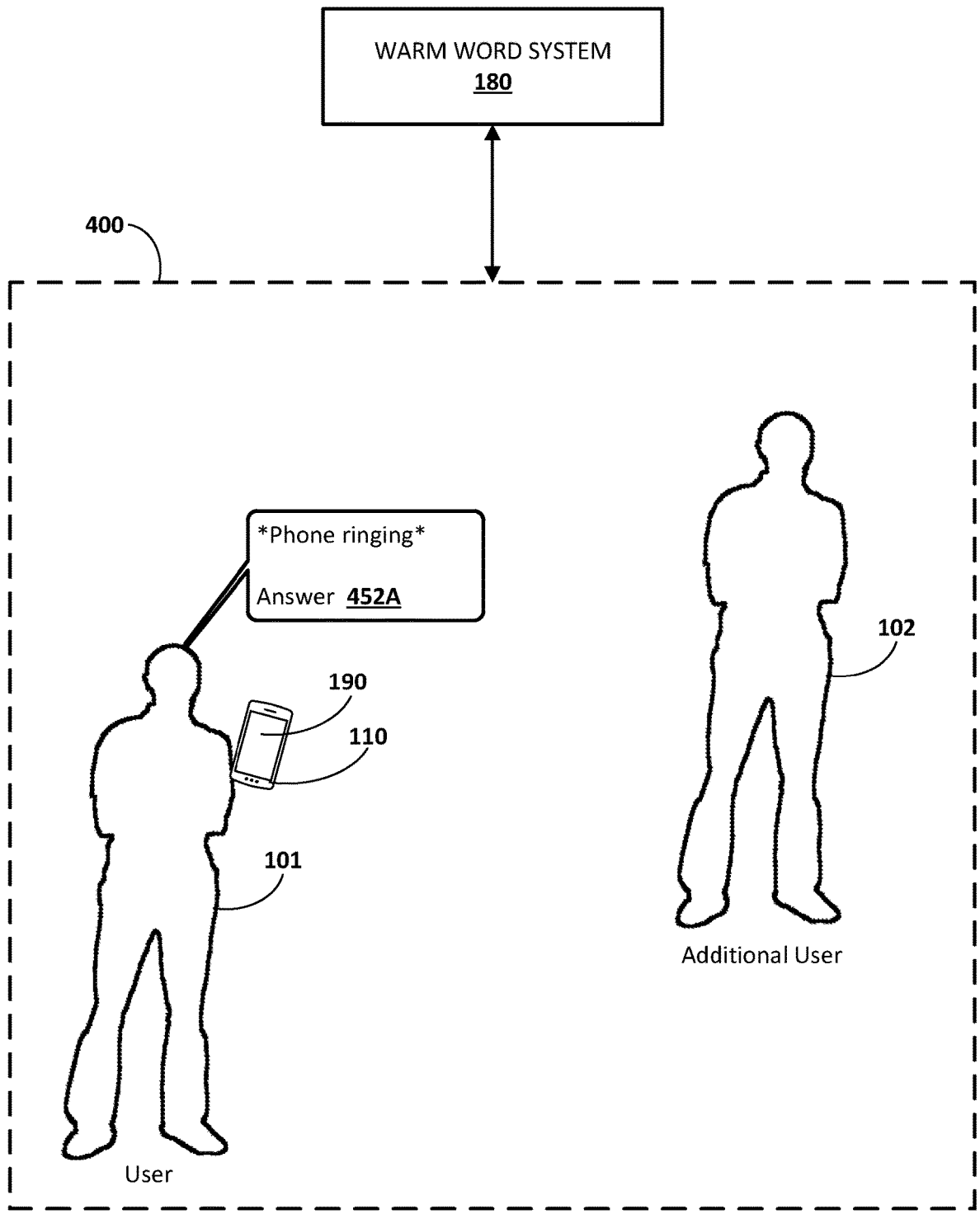
FIG. 4A, FIG. 4B, and FIG. 4C depict various non-limiting examples of determining whether to cause an assistant command to be performed based on contextual audio data, in accordance with various implementations.
Figure 4B:
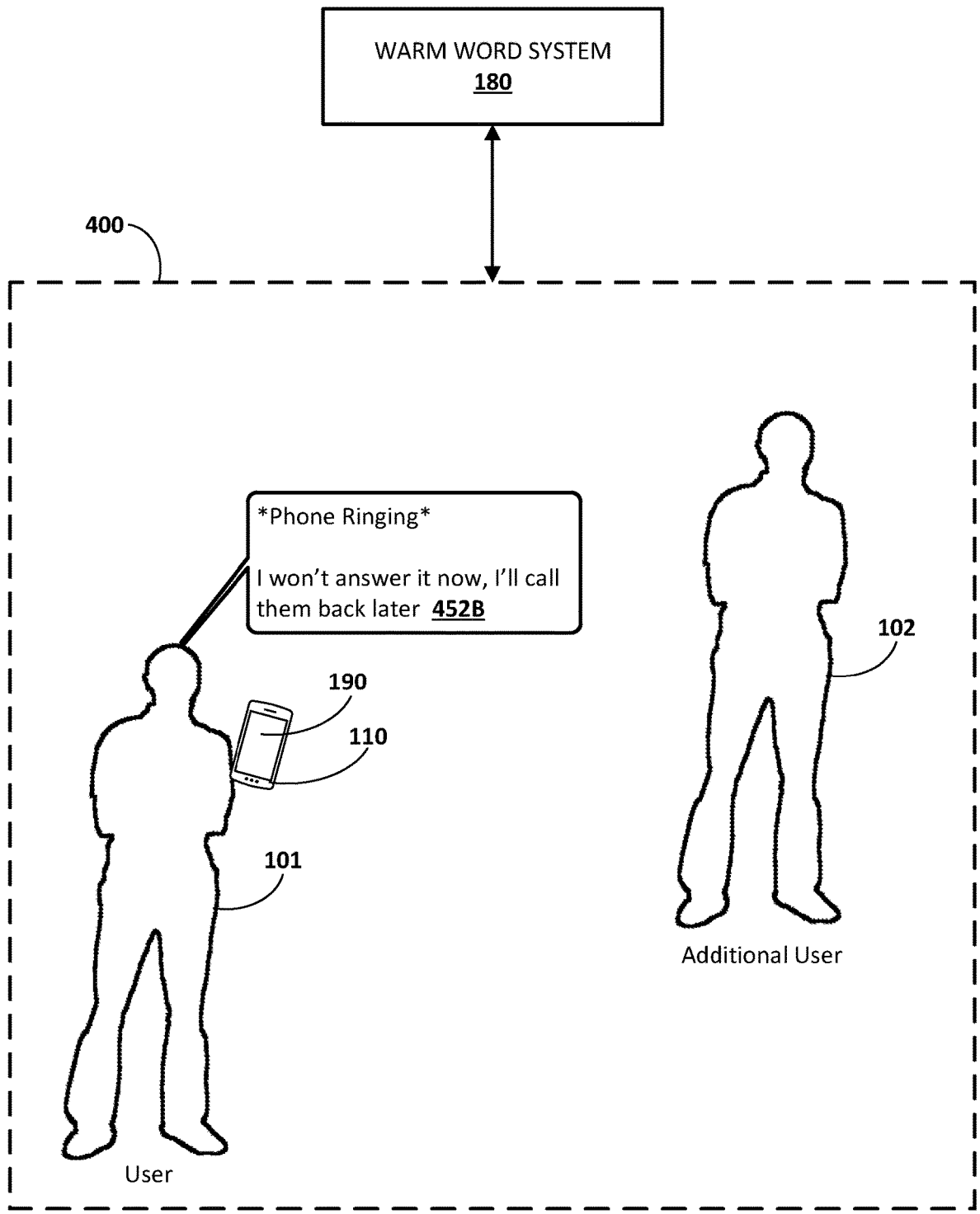
Figure 4C:
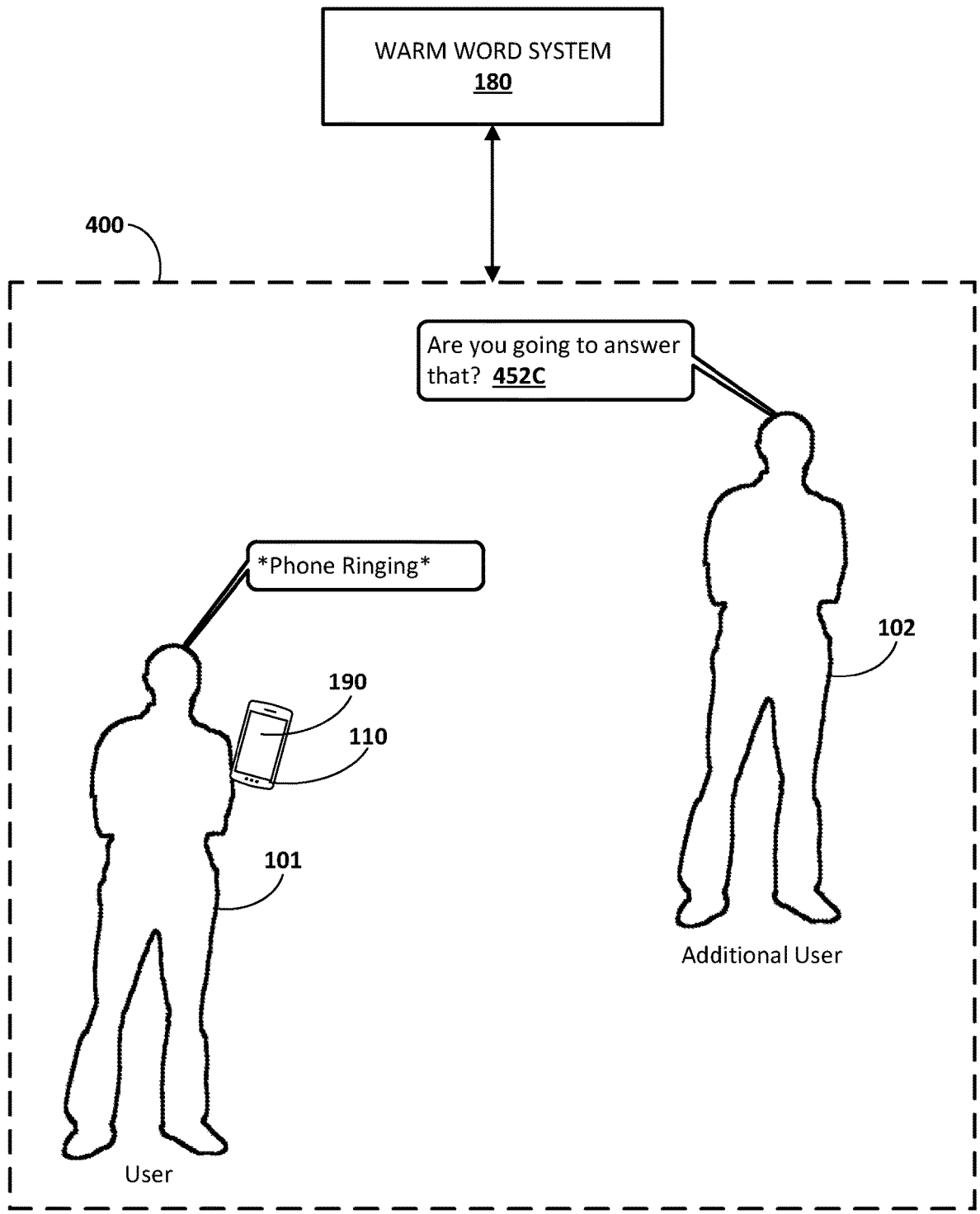

Turning now to FIGS. 4A, 4B, and 4C various non-limiting examples of determining whether to cause an assistant command to be performed based on contextual audio data utilizing the method 300 of FIG. 3 are depicted. An automated assistant can be implemented at least in part at the client device 110 (e.g., the automated assistant 115 described with respect to FIG. 1). The automated assistant can utilize a warm word system 180 (e.g., the warm word system 180 described with respect to FIG. 1) to determine whether to cause an assistant command to be performed based on contextual audio data (e.g., as described with respect to the method 300 of FIG. 3).

The client device 110 depicted in FIGS. 4A, 4B, and 4C may include various user interface components including, for example, microphone(s) to generate audio data based on spoken utterances and/or other audible input, speaker(s) to audibly render synthesized speech and/or other audible output, and a display 190 to receive touch input and/or to visually render transcriptions and/or other visual output. Further, the display 190 of the client device 110 includes various system interface elements (e.g., hardware and/or software interface elements) that may be interacted with by the user of the client device 110 to cause the client device 110 to perform one or more actions (e.g., as described with respect to FIGS. 6B and 6C). Although the client device 110 depicted in FIGS. 4A-4C is a mobile device, it should be understood that is for the sake of example and is not meant to be limiting.

Referring specifically to FIG. 4A, assume a user 101 associated with the client device 110 is co-located in an environment 400 with an additional user 102. Further assume a phone call is received at the client device 110. In this example, the automated assistant can determine that the phone call being received at the client device 110 corresponds to a warm word activation event. As a result, the automated assistant can activate one or more currently dormant automated assistant functions that utilize one or more warm word models associated with the phone call event. The one or more warm word models associated with the phone call event can be utilized to process a stream of audio data generated by microphone(s) of the client device 110 to monitor for occurrences of particular word and/or phrases associated with the phone call event (e.g., "answer", "decline", "screen call", send to voicemail", etc.) that, when detected, cause the automated assistant to perform a particular action associated with the particular words and/or phrases.

For example, and as shown in FIG. 4A, assume that, while the client device 110 is ringing, the user 101 of the client device 110 provides a spoken utterance 452A of "Answer". In this example, the automated assistant, in processing the stream of audio data generated by the microphone(s) of the client device 110 using the one or more warm word models associated with the phone call event, can determine that the audio data corresponds to a warm word of "Answer" that, when detected, causes the automated assistant to answer the phone call on behalf of the user 101. Further, the automated assistant can cause the stream of audio data to be processed using a VAD model to determine whether there is any additional voice activity. In this example, output generated using the VAD model will indicate that there is no additional voice activity, and, as a result, there is no contextual audio data to be processed to determine whether the user 101 did, in fact, intend the spoken utterance 452A to cause the phone call to be answered. As a result, the automated assistant will cause the phone call to be answered at the client device 110.

In contrast, and as shown in FIG. 4B, assume that, while the client device 110 is ringing, the user 101 of the client device 110 provides a spoken utterance 452B of "I won't answer it now, I'll call them back later". In this example, the automated assistant, in processing the stream of audio data generated by the microphone(s) of the client device 110 using the one or more warm word models associated with the phone call event, can determine that a portion of the audio data corresponds to a warm word of "Answer" that, when detected, causes the automated assistant to answer the phone call on behalf of the user 101. Further, the automated assistant can cause the stream of audio data to be processed using a VAD model to determine whether there is any additional voice activity. In this example, output generated using the VAD model will indicate that there is additional voice activity, and, as a result, there is contextual audio data to be processed to determine whether the user 101 did, in fact, intend the spoken utterance 452B to cause the phone call to be answered. As a result, the automated assistant will cause a preamble portion of the audio data and/or a postamble portion of the audio data to be obtained.

In this example, the preamble portion of the audio data corresponds to "I won't" of the spoken utterance 452B. The automated assistant can cause the preamble portion of the audio data to be processed using ASR model(s) to generate ASR output for the preamble portion of the audio data. Further, the automated assistant can cause the ASR output to be processed using NLU model(s) to generate NLU output for the preamble portion of the audio data. The automated assistant can determine whether the user 101 did, in fact, intend the spoken utterance 452B to cause the phone call to be answered based on the ASR output and/or the NLU output for the preamble portion of the audio data. For instance, the automated assistant can determine that "won't" negates the warm word "Answer" based on the ASR output and/or the NLU output. Accordingly, in this example, the automated assistant will refrain from causing the phone call to be answered at the client device 110 based on processing the preamble portion of the audio data. In various implementations, one or more negative warm word models can additionally or alternatively be utilized that are in addition to the warm word models described herein. In these implementations, the one or more negative warm word models can be utilized to detect other words and/or phrases in close proximity to a warm word that negates the warm word (e.g., "won't", "can't", "don't", etc.). Further, if one or more of these negative warm word models detect other words and/or phrases in close proximity to a warm word, one or more automated assistant components that utilize the ASR model(s) and/or the NLU model(s) can remain dormant.

In some implementations, and assuming the automated assistant cannot determine whether the user 101 did, in fact, intend the spoken utterance 452B to cause the phone call to be answered based on processing the preamble portion of the audio data, the automated assistant can further cause the postamble portion of the audio data to be processed using ASR model(s) to generate ASR output for the postamble portion of the audio data (e.g., corresponding to "I'll call them back later" of the spoken utterance 452B). Further, the automated assistant can cause the ASR output to be processed using NLU model(s) to generate NLU output for the postamble portion of the audio data. The automated assistant can determine whether the user 101 did, in fact, intend the spoken utterance 452B to cause the phone call to be answered based on the ASR output and/or the NLU output for the postamble portion of the audio data. For instance, the automated assistant can determine that "I'll call them back later" indicates the user 101 does not intend the phone call to be answered at this instance in time, such that the postamble portion of the audio data negates the warm word "Answer" based on the ASR output and/or the NLU output. Accordingly, in this example, the automated assistant will refrain from causing the phone call to be answered at the client device 110 based on further processing the postamble portion of the audio data.

As another example, and as shown in FIG. 4C, assume that, while the client device 110 is ringing, the additional user 102 that is co-located in the environment of the user 101 associated with the client device 110 provides a spoken utterance 452C of "Are you going to answer that?". In this example, the automated assistant, in processing the stream of audio data generated by the microphone(s) of the client device 110 using the one or more warm word models associated with the phone call event, can determine that the audio data corresponds to a warm word of "Answer" that, when detected, causes the automated assistant to answer the phone call on behalf of the user 101. Further, the automated assistant can cause the stream of audio data to be processed using a VAD model to determine whether there is any additional voice activity. In this example, output generated using the VAD model will indicate that there is additional voice activity, and, as a result, there is contextual audio data to be processed. However, and in contrast with the examples of FIGS. 4A and 4B, the spoken utterance 452C was provided by the additional user 102 and not the user 101 that is associated with the client device 110.

In additional or alternative implementations, and as described with respect to FIGS. 5 and 6A-6C, an identity of a user that provided the spoken utterance 452A, 452B, and/or 452C may need to be verified prior the automated assistant causing the assistant command to be performed. Further, the automated assistant may additionally or alternatively need to determine that the identified user is authorized to cause performance of the assistant command. These assistant commands that the automated assistant needs to verify an identity of the user that provided the spoken utterance and/or determine whether the user is authorized can be assistant commands associated with particular warm word model(s), associated with particular software applications that are accessible at the client device 110, associated with particular devices to be controlled based on the assistant command, and/or other subsets of assistant commands.

Nonetheless, and with respect to FIG. 4C, the automated assistant can still cause a preamble portion of the audio data and/or a postamble portion of the audio data to be obtained. Put another way, the automated assistant may not attempt to verify an identity of the additional user 102 that provided the spoken utterance 452C if the spoken utterance is not intended to cause the assistant command to be performed. In this example, the preamble portion of the audio data corresponds to "Are you going to" of the spoken utterance 452C. The automated assistant can cause the preamble portion of the audio data to be processed in the same or similar manner described above to generate ASR output and NLU output for the preamble portion of the audio data (and optionally in combination with the portion of the audio data that corresponds to one or more of the particular terms or phrases and/or the postamble portion of the audio data (e.g., as a single instance of the audio data or multiple disparate instances of the audio data)). Further, the automated assistant can determine whether the additional user 102 did, in fact, intend the spoken utterance 452C to cause the phone call to be answered based on the ASR output and/or the NLU output for the preamble portion of the audio data. For instance, the automated assistant can determine that "are you going to" based on the ASR output and/or the NLU output corresponds to a question being posed by the additional user 102 to the user 101 associated with the client device 110, and is not intended to cause the phone call to be answered. Accordingly, in this example, the automated assistant will refrain from causing the phone call to be answered at the client device 110 based on processing the preamble portion of the audio data (and optionally further processing of the postamble audio data corresponding to "that" of the spoken utterance 452C).

Although FIGS. 4A-4C are described with respect to particular warm words that cause particular assistant commands to be performed, it should be understood that is for the sake of example and is not meant to be limiting. Rather, it should be understood that the techniques described with respect to FIGS. 4A-4C can be utilized to detect any warm word activation event, detect any warm word using warm word model(s) associated with the warm word activation event, and to cause any assistant command to be performed.

Figure 5:
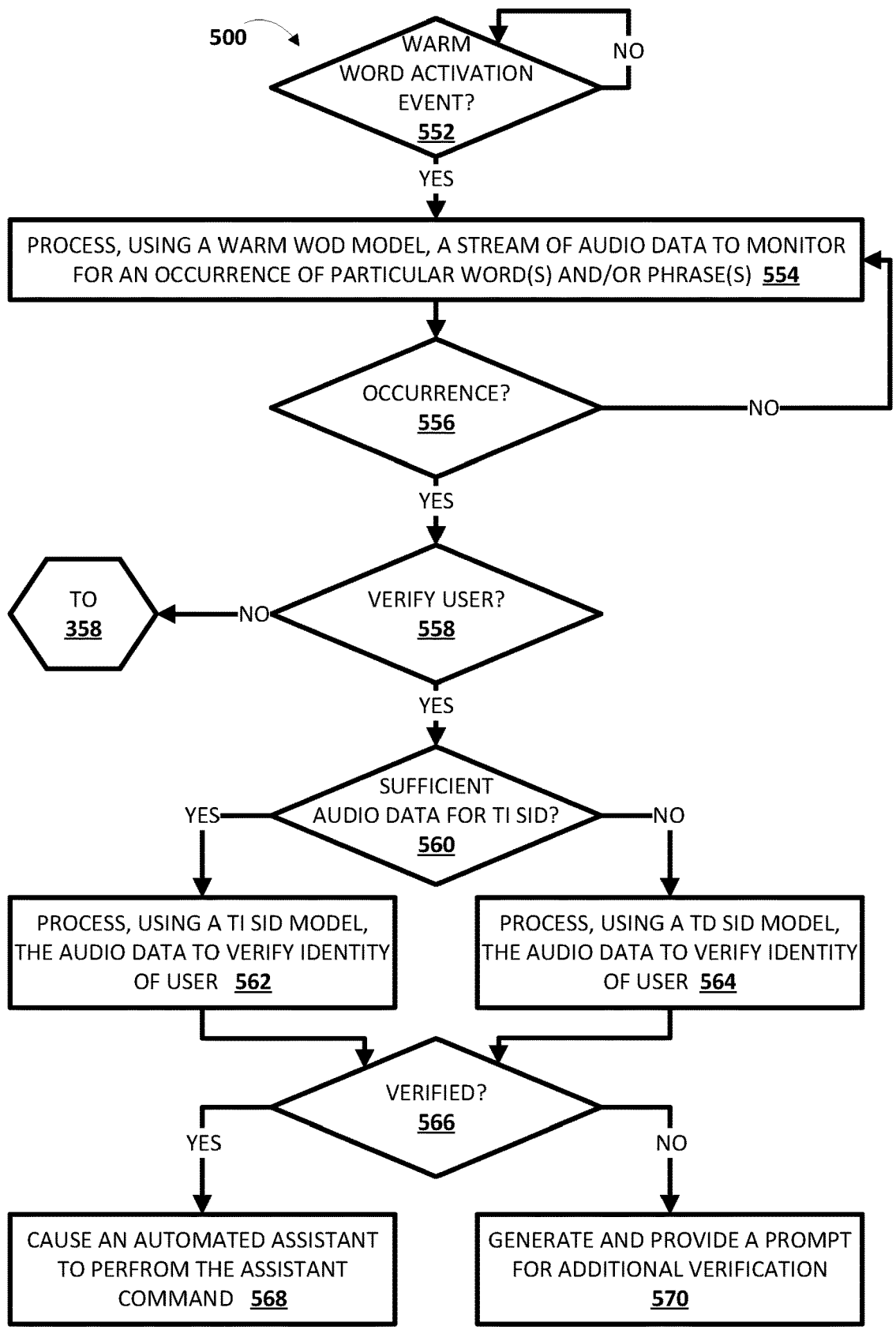
FIG. 5 depicts a flowchart illustrating an example method of determining whether to cause an assistant command to be performed based on speaker identification, in accordance with various implementations.

Turning now to FIG. 5, a flowchart illustrating an example method 500 of determining whether to an assistant command to be performed based on speaker identification is depicted. For convenience, the operations of the method 500 are described with reference to a system that performs the operations. This system of the method 500 includes one or more processors, memory, and/or other component(s) of computing device(s) (e.g., client device 110 of FIGS. 1, 4A-4C, and 6A-6C, and/or computing device 710 of FIG. 7, one or more servers, and/or other computing devices). Moreover, while operations of the method 500 are shown in a particular order, this is not meant to be limiting. One or more operations may be reordered, omitted, and/or added.

At block 552, the system monitors for an occurrence of a warm word activation event. If, at an iteration of block 552, the system does not detect an occurrence of a warm word activation event, the system can continue monitoring for an occurrence of a warm word activation event at block 552. If, at an iteration of block 552, the system detects an occurrence of a warm word activation event, the system can proceed to block 554. At block 554, the system processes, using one or more warm word models, a stream of audio data to monitor for an occurrence of one or more particular words and/or phrases (e.g., a warm word). At block 356, the system determines whether an occurrence of one or more of the particular word and/or phrases is detected in the stream of audio data. If, at an iteration of block 556, the system does not detect an occurrence of one or more of the particular word and/or phrases, the system can return to block 554 and continue processing the stream of audio data and monitoring for an occurrence of one or more of the particular words and/or phrases at block 556 until one or more of the conditions are satisfied. If, at an iteration of block 556, the system does detect an occurrence of one or more of the particular word and/or phrases, the system proceeds to block 558. The operations of blocks 552, 554, and 556 can be performed in the same or similar manner described with respect to blocks 352, 354, and 356 of the method 300 of FIG. 3, respectively.

At block 558, the system determines whether to verify an identity of a user that provided a spoken utterance captured in the stream of audio data that includes one or more of the particular word and/or phrases. The system can determine whether to verify the identity of the user that provided the spoken utterance based on one or more of the particular word and/or phrases being associated with particular warm word model(s), associated with particular software applications that are accessible at a client device of the user, associated with particular devices to be controlled based on the assistant command, and/or other subsets of assistant commands. For example, in implementations where the assistant command causes media being played at the client device or causes smart lights to be controlled, then an identity of the user may not need to be verified. However, in implementations where the assistant command causes a reply to an incoming electronic communication (e.g., phone call, text message, email, social media message, etc.) or causes smart locks to be controlled, then an identity of the user may need to be verified. If, at an iteration of block 558, the system determines that the identity of the user that provided the spoken utterance does not need to be verified, then the system can proceed to block 358 of FIG. 3 and continue performance of the method 300 of FIG. 2. If, at an iteration of block 558, the system determines that the identity of the user that provided the spoken utterance needs to be verified, then the system can proceed to block 560.

At block 560, the system determines whether the audio data included in the stream of audio data is sufficient to perform TI SID. The system can determine whether the audio data included in the stream of audio data is sufficient to perform TI SID by comparing a length of a spoken utterance captured in the audio data to a threshold length. The system can determine the audio data is sufficient to perform TI SID if the spoken utterance satisfies the threshold length. If, at an iteration of block 560, the system determines the audio data is sufficient to perform TI SID, then the system can proceed to block 562. At block 562, the system processes, using a TI SID model, the audio data to verify an identity of the user. At block 566, from block 562, the system determines whether the identity of the user is verified. For example, the system can process the audio data using the TI SID model to generate a TI speaker embedding for the user that provided the spoken utterance. Further, the system can compare, in an embedding space, the TI speaker embedding for the user that provided the spoken utterance to one or more previously generated TI speaker embeddings for one or more users of the client device. Moreover, the system can determine, based on a distance metric determined based on the comparing, whether the TI speaker embedding corresponds to one or more of the previously generated TI speaker embeddings. If, at an iteration of block 566, from block 562, the system determines the distance metric satisfies a distance threshold, the identity of the user that provided the spoken utterance can be verified as a user associated with the client device, and assuming the identified user is authorized to cause performance of the assistant command, at block 568, the system can cause an automated assistant to perform the assistant command. However, if, at an iteration of block 566, from block 562, the system determines the distance metric does not satisfy the distance threshold, the system can, at block 570, generate and provide a prompt for additional verification of the identity of the user (e.g., request the user that provided the spoken utterance provide faceprint identification or fingerprint identification) to cause the automated assistant to perform the assistant command.

If, at an iteration of block 560, the system determines the audio data is not sufficient to perform TI SID, then the system can proceed to block 564. At block 564, the system processes, using a TD SID model, the audio data to verify an identity of the user. At block 566, from block 562, the system determines whether the identity of the user is verified. For example, the system can process the audio data using the TD SID model to generate a TD speaker embedding for the user that provided the spoken utterance. Further, the system can compare, in an embedding space, the TD speaker embedding for the user that provided the spoken utterance to one or more previously generated TI speaker embeddings for one or more users of the client device. Notably, the TD speaker embedding corresponds to a speaker embedding for one or more particular words and/or phrases (e.g., the portion of the audio data that corresponds to the warm word detected at block 556). Moreover, the system can determine, based on a distance metric determined based on the comparing, whether the TD speaker embedding corresponds to one or more of the previously generated TD speaker embeddings for one or more of the particular words and/or phrases. If, at an iteration of block 566, from block 564, the system determines the distance metric satisfies a distance threshold, the identity of the user that provided the spoken utterance can be verified as a user associated with the client device, and assuming the identified user is authorized to cause performance of the assistant command, at block 568, the system can cause an automated assistant to perform the assistant command. However, if, at an iteration of block 566, from block 564, the system determines the distance metric does not satisfy the distance threshold, the system can, at block 570, generate and provide a prompt for additional verification of the identity of the user (e.g., request the user that provided the spoken utterance provide an example utterance for TI SID verification or TD SID verification and/or request the user that provided the spoken utterance provide faceprint identification or fingerprint identification) to cause the automated assistant to perform the assistant command.

Notably, although FIG. 5 is described with respect to separately performing TI SID and TD SID to verify an identity of a user that provided the spoken utterance, it should be understood that is for the sake of example and is not meant to be limiting. For example, in implementations where the spoken utterance is of a sufficient length to perform TI SID, both TI SID and TD SID may be performed to verify the identity of the user that provided the spoken utterance. As another example, in various implementations, TD SID may only be performed if it is determined that one or more of the previously generated TD speaker embeddings correspond to one or more particular words and/or phrases captured in the spoken utterance. Further, these techniques can be utilized to verify portions of the spoken utterance captured in the stream of audio data that were provided by the same user. For instance, assume the stream of audio data captures a first spoken utterance from a first user of "don't", and a second spoken utterance from a second user of "answer". Further assume the second user is associated with the client device and is an authorized answer, and a TD speaker embedding for the second user for the spoken utterance of "answer" was previously generated and stored at the client device. In this instance, the TD speaker embedding generated using the TD SID model can indicate that the second user is a verified user that is authorized to cause performance of an assistant command to answer an incoming phone call at the client device. Further, multiple TI speaker embeddings for the "don't" spoken utterance and the "answer" spoken utterance can indicate that different users provided the spoken utterances captured in the stream of audio data. Accordingly, in this example, the system can cause the automated assistant to answer the incoming phone call.

Figure 6A:
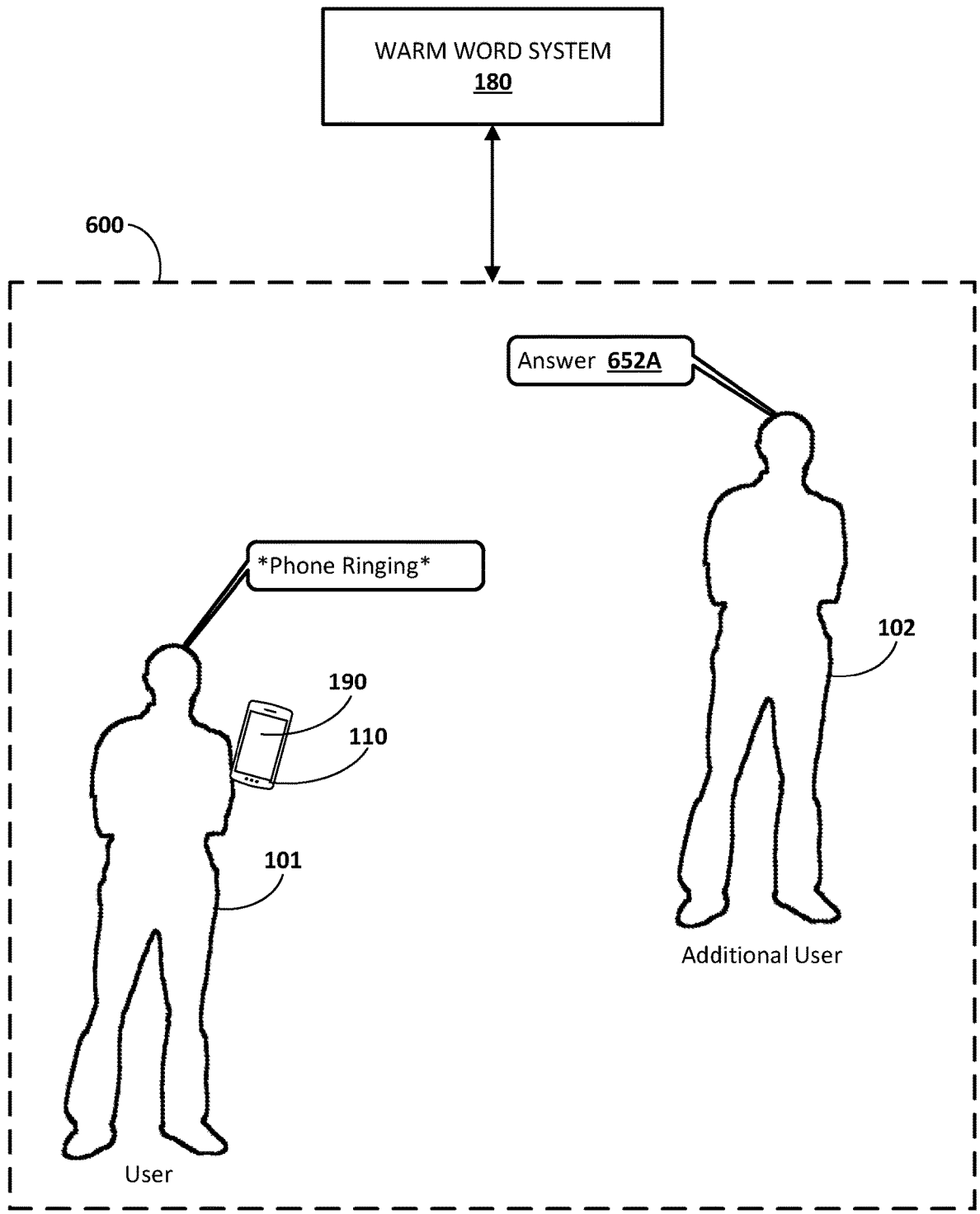
FIG. 6A, FIG. 6B, and FIG. 6C depict various non-limiting examples of determining whether to cause an assistant command to be performed based on speaker identification, in accordance with various implementations.
Figure 6B:
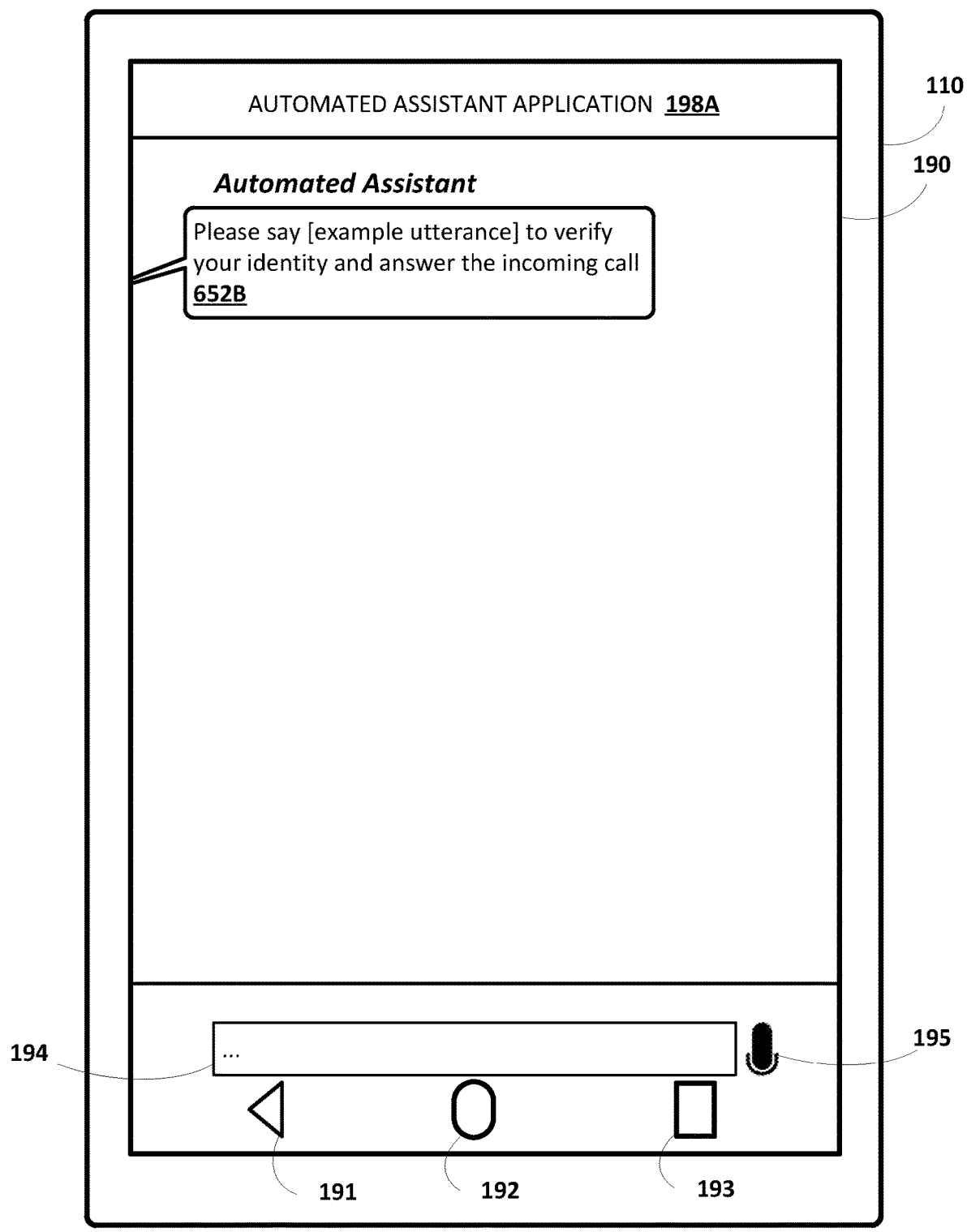
Figure 6C:
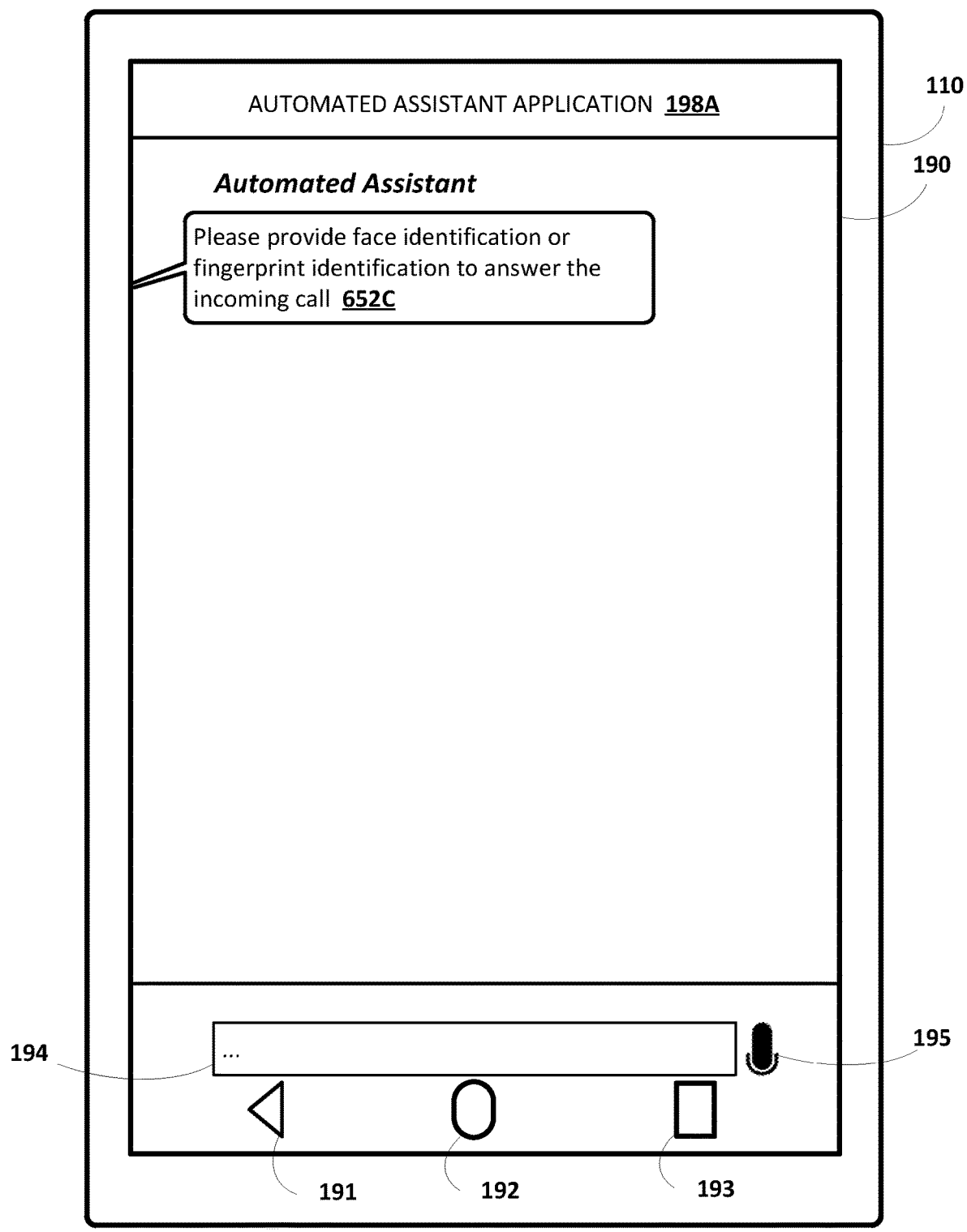

Turning now to FIGS. 6A, 6B, and 6C various non-limiting examples of determining whether to an assistant command to be performed based on speaker identification utilizing the method 500 of FIG. 5 are depicted. An automated assistant can be implemented at least in part at the client device 110 (e.g., the automated assistant 115 described with respect to FIG. 1). The automated assistant can utilize a warm word system 180 (e.g., the warm word system 180 described with respect to FIG. 1) to determine whether to cause an assistant command to be performed based on contextual audio data (e.g., as described with respect to the method 500 of FIG. 5).

Similar to the client device depicted in FIGS. 4A-4C, the client device 110 depicted in FIGS. 6A-6C 6C may include various user interface components including, for example, microphone(s) to generate audio data based on spoken utterances and/or other audible input, speaker(s) to audibly render synthesized speech and/or other audible output, and a display 190 to receive touch input and/or to visually render transcriptions and/or other visual output. Further, and as shown in FIGS. 6B and 6C, the display 190 of the client device 110 includes various system interface elements 191, 192, and 193 (e.g., hardware and/or software interface elements) that may be interacted with by the user of the client device 110 to cause the client device 110 to perform one or more actions. The display 190 of the client device 110 enables the user to interact with content rendered on the display 190 by touch input (e.g., by directing user input to the display 190 or portions thereof (e.g., to text entry box 194 or to other portions of the display 190) and/or by spoken input (e.g., by selecting microphone interface element 195—or just by speaking without necessarily selecting the microphone interface element 195 (i.e., the automated assistant may monitor for one or more particular terms or phrases, gesture(s) gaze(s), mouth movement(s), lip movement(s), and/or other conditions to activate spoken input at the client device 110). Although the client device 110 depicted in FIGS. 6A-6C is a mobile device, it should be understood that is for the sake of example and is not meant to be limiting.

Referring specifically to FIG. 6A, assume a user 101 associated with the client device 110 is co-located in an environment 600 with an additional user 102. Further assume a phone call is received at the client device 110. In this example, the automated assistant can determine that the phone call being received at the client device 110 corresponds to a warm word activation event. As a result, the automated assistant can activate one or more currently dormant automated assistant functions that utilize one or more warm word models associated with the phone call event. The one or more warm word models associated with the phone call event can be utilized to process a stream of audio data generated by microphone(s) of the client device 110 to monitor for occurrences of particular word and/or phrases associated with the phone call event (e.g., "answer", "decline", "screen call", send to voicemail", etc.) that, when detected, cause the automated assistant to perform a particular action associated with the particular words and/or phrases.

For example, and as shown in FIG. 6A, assume that, while the client device 110 is ringing, the additional user 102 provides a spoken utterance 652A of "Answer". Notably, and in contrast with FIG. 4A, the spoken utterance 652A of "Answer" is provided by the additional user 102 and not the user 101 associated with the client device 110. In this example, the automated assistant, in processing the stream of audio data generated by the microphone(s) of the client device 110 using the one or more warm word models associated with the phone call event, can determine that the audio data corresponds to a warm word of "Answer" that, when detected, causes the automated assistant to answer the phone call. Further assume that an identity of the user that provided the spoken utterance 652A (e.g., the additional user 102) needs to be verified to cause the automated assistant to answer the phone call.

In this example, the automated assistant can determine whether the spoken utterance 652A is of a sufficient length to perform TI SID to verify the identity of the user that provided the spoken utterance. In this example, further assume that the spoken utterance 652A is not of a sufficient length to perform TI SID. However, the automated assistant can attempt to verify the identity of the user that provided the spoken utterance 652A using TD SID (and assuming there is one or more previously generated TD speaker embedding exists for "Answer", and regardless of whether TI SID is performed). For example, the automated assistant can process, using a TD SID model, the portion of the audio data that corresponds to the one or more particular words and/or phrases to generate a TD speaker embedding for "Answer". Further, the automated assistant can compare, in embedding space, the TD speaker embedding for "Answer" to one or more previously generated speaker embeddings for "Answer". Moreover, the automated assistant can determine, based on a distance metric determined based on the comparing, whether the user that provided the spoken utterance 652A is the user 101 of the client device 110. In this example, the automated assistant can determine that the TD speaker embedding for "Answer" does not match the one or more previously generated speaker embeddings for "Answer". Accordingly, the automated assistant may refrain from causing the assistant command of answering the phone call on behalf of the user 101 to be performed since the automated assistant did not verify the identity of the user that provided the spoken utterance 652A (e.g., the additional user 102).

However, in various implementations, the automated assistant can generate a prompt to be provided for presentation (e.g., visually and/or audibly) to the user 101 that requests the user provide additional verification to cause the assistant command to be performed. For example, and referring specifically to FIG. 6B, the automated assistant can generate a prompt 652B of "please say [example utterance] to verify your identity and answer the incoming call", and cause the prompt to be provided for visual presentation to the user via an automated assistant application 198A that is accessible at the client device 110. Accordingly, the user 101 of the client device 110 can provide additional user input responsive to the prompt to verify whether the user 101 did, in fact, intend the automated assistant to answer the phone call. In this example, the automated assistant can request that the user 101 provide an example utterance that is of a sufficient length to perform TI SID on the example utterance, or that corresponds to another particular term or phrase for which the client device 110 has access to one or more previously generated TD speaker embeddings. Assuming the user 101 of the client device 110 did not provide the spoken utterance to cause the automated assistant to answer the phone call (e.g., in the example of FIG. 6A), the user 101 may ignore or dismiss the prompt 652B. However, assuming the user 101 of the client device 110 did provide the spoken utterance to cause the automated assistant to answer the phone call (e.g., in the example of FIG. 4A), the user 101 may provide the example utterance.

As another example, and referring specifically to FIG. 6C, the automated assistant can generate a prompt 652C of "please provide face identification or fingerprint identification to answer the incoming call", and cause the prompt to be provided for visual presentation to the user via the automated assistant application 198A that is accessible at the client device 110. Accordingly, the user 101 of the client device 110 can provide additional user input responsive to the prompt to verify whether the user 101 did, in fact, intend the automated assistant to answer the phone call. In this example, the automated assistant can request that the user 101 provide this biometric identification in instances where the identity of the user that provided the spoken utterance cannot be identification. In some instances, this biometric information may only be requested in response to determining that TD SID and TD SID are insufficient to identify the user that provided the spoken utterance. Assuming the user 101 of the client device 110 did not provide the spoken utterance to cause the automated assistant to answer the phone call (e.g., in the example of FIG. 6A), the user 101 may ignore or dismiss the prompt 652C. However, assuming the user 101 of the client device 110 did provide the spoken utterance to cause the automated assistant to answer the phone call (e.g., in the example of FIG. 4A), the user 101 may provide the biometric information.

Although the prompts 652B and 652C depicted in FIGS. 6B and 6C are provided for presentation to the user 101 via the automated assistant application 198A that is accessible at the client device 110, it should be understood that is for the sake of example and is not meant to be limiting. For instance, the promos 652B and 652C may additionally or alternatively be audibly rendered for presentation to the user via speaker(s) of the client device 110, visually rendered as notifications (e.g., pop-up notifications, banner notifications, etc.) for presentation to the user vis the display 190 of the client device 110. Moreover, although FIGS. 6A-6C are described with respect to particular warm words that cause particular assistant commands to be performed, it should be understood that is for the sake of example and is not meant to be limiting. Rather, it should be understood that the techniques described with respect to FIGS. 6A-6C can be utilized to detect any warm word activation event, detect any warm word using warm word model(s) associated with the warm word activation event, and to cause any assistant command to be performed when an identity of the user that provided the spoken utterance is verified as an authorized user.

Figure 7:
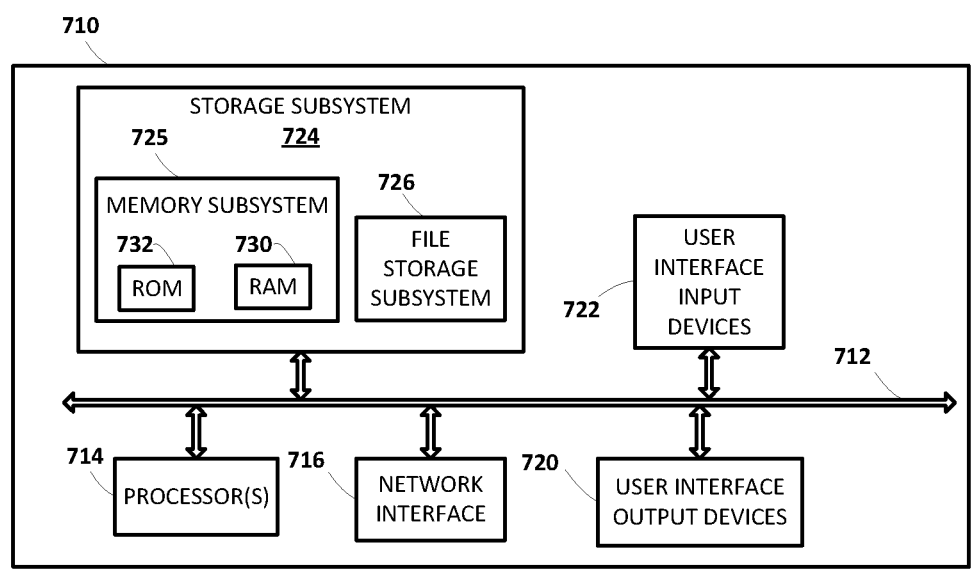
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1 and 2.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes processing, using a warm word model, a stream of audio data to monitor for an occurrence of one or more particular words or phrases, the stream of audio data being generated by one or more microphones of a client device of a user, and each of the one or more particular words or phrases being associated with an assistant command; in response to determining a portion of the audio data corresponds to one or more of the particular words or phrases: processing, using an automatic speech recognition (ASR) model, a preamble portion of the audio data and/or a postamble portion of the audio data to generate ASR output; and determining, based on processing the ASR output, whether the user intended the one or more particular words or phrases to cause performance of the assistant command. The preamble portion of the audio data precedes the portion of the audio data that corresponds to the one or more particular words or phrases, and the postamble portion of the audio data follows the portion of the audio data that corresponds to the one or more particular words or phrases. The method further includes, in response to determining the user did not intend the one or more particular words or phrases to cause performance of the assistant command that is associated one or more of the particular words or phrases: refraining from causing an automated assistant to perform the assistant command that is associated with one or more of the particular words or phrases; and in response to determining the user intended the one or more particular words or phrases to cause performance of the assistant command that is associated with one or more of the particular words or phrases: causing the automated assistant to perform the assistant command that is associated with one or more of the particular words or phrases.

These and other implementations of technology disclosed herein can optionally include one or more of the following features.

In some implementations, the method may further include detecting an occurrence of a warm word activation event; and in response to detecting the occurrence of the warm word activation event, activating one or more currently dormant automated assistant functions that utilize the warm word model. Processing the stream of audio data using the warm word model to monitor for the occurrence of the one or more particular words or phrases may be in response to activating the one or more currently dormant automated assistant functions that utilize the warm word model. In some versions of those implementations, the warm word activation event may include one or more of: a phone call being received at the client device, a text message being received at the client device, an email being received at the client device, an alarm sounding at the client device, a timer sounding at the client device, media being played at the client device or an additional client device in an environment of the client device, a notification being received at the client device, a location of the client device, or a software application being accessible at the client device.

In some implementations, determining whether the user intended the one or more particular words or phrases to cause performance of the assistant command that is associated with the one or more particular words or phrases based on processing the ASR output may include processing, using a natural language understanding (NLU) model, the ASR output to generate NLU output; and determining, based on the NLU output, whether the user intended the one or more particular words or phrases to cause performance of the assistant command. The ASR output may be generated based on the preamble portion of the audio data, but not the postamble portion of the audio data. In some versions of those implementations, the method may further include, in response to determining the NLU output is insufficient for determining whether the user intended the one or more particular words or phrases to cause performance of the assistant command that is associated with one or more of the particular words or phrases: processing, using the ASR model, the postamble portion of the audio data to generate additional ASR output; and determining, based on processing the additional ASR output, whether the user intended the one or more particular words or phrases to cause performance of the assistant command that is associated with one or more of the particular words or phrases.

In some implementations, determining whether the user intended the one or more particular words or phrases to cause performance of the assistant command that is associated with one or more of the particular words or phrases based on processing the ASR output may include: processing, using a natural language understanding (NLU) model, the ASR output to generate NLU output; and determining, based on the NLU output, whether the user intended the one or more particular words or phrases to cause performance of the assistant command. The ASR output may be generated based on both the preamble portion of the audio data and the postamble portion of the audio data. In some versions of those implementations, the method may further include, in response to determining the NLU output is insufficient for determining whether the user intended the one or more particular words or phrases to cause performance of the assistant command that is associated with one or more of the particular words or phrases: processing, using the ASR model, an additional postamble portion of the audio data to generate additional ASR output; and determining, based on processing the additional ASR output, whether the user intended the one or more particular words or phrases to cause performance of the assistant command that is associated with one or more of the particular words or phrases. The additional postamble portion of the audio data may follow the postamble portion of the audio data.

In some implementations, the method may further include processing, using an endpointing model, the stream of audio data to generate a plurality of timestamps for a spoken utterance that is captured in the stream of audio data, and that includes the one or more particular words or phrases. In some versions of those implementations, the plurality of timestamps may include at least a first timestamp associated with a first time when the user began providing the spoken utterance, a second timestamp associated with a second time, that is subsequent to the first time, when the user began providing the one or more particular words or phrases included in the spoken utterance, a third timestamp associated with a third time, that is subsequent to the second time, when the user finished providing the one or more particular words or phrases included in the spoken utterance, and a fourth timestamp associated with a fourth time, that is subsequent to the third time, when the user finished providing the spoken utterance. In some further versions of those implementations, the preamble portion of the audio data may include any audio data that corresponds to the spoken utterance between the first timestamp and the second timestamp. In additional or alternative versions of those implementations, the postamble portion of the audio data may include any audio data that corresponds to the spoken utterance between the third timestamp and the fourth timestamp.

In some implementations, the method may further include activating one or more currently dormant automated assistant functions that utilize the ASR model in response to determining that the spoken utterance includes one or more of the particular words or phrases.

In some implementations, the method may further include processing, using the ASR model, and along with the preamble portion of the audio data and/or the postamble portion audio data, the portion of the audio data that corresponds to the one or more particular words or phrases to generate the ASR output.

In some implementations, the method may further include processing, using a voice activity detection (VAD) model, the stream of audio data to monitor for an occurrence of additional voice activity before the portion of the audio data corresponds to one or more of the particular words or phrases and/or after the portion of the audio data corresponds to one or more of the particular words or phrases; and in response to detecting the occurrence of the additional voice activity: activating one or more currently dormant automated assistant functions that utilize the ASR model. In some versions of those implementations, the method may further include, in response to detecting no occurrence of the additional voice activity: causing the automated assistant to perform the assistant command that is associated with one or more of the particular words or phrases.

In some implementations, the method may further include processing, using an acoustic model, the audio data to determine one or more prosodic properties of the spoken utterance. Determining whether the user intended the one or more particular words or phrases to cause performance of the assistant command that is associated with one or more of the particular words or phrases may be further based on the one or more prosodic properties of the spoken utterance.

In some implementations, the method may further include receiving, from one or more sensors of the client device, an instance of sensor data. Determining whether the user intended the one or more particular words or phrases to cause performance of the assistant command that is associated with one or more of the particular words or phrases may be further based on the instance of the sensor data. In some versions of those implementations, the instance of sensor data may include one or more of: accelerometer data generated by an accelerometer of the client device, image data generated by one or more camera components of the client device, motion data generated by one or more motion sensors of the client device.

In some implementations, the method may further include obtaining the preamble portion of the audio data from an audio buffer of the client device; and/or obtaining the postamble portion of the audio data from the stream of audio data.

In some implementations, a method implemented by one or more processors is provided, and includes processing, using a warm word model, a stream of audio data to monitor for an occurrence of one or more particular words or phrases, the stream of audio data being generated by one or more microphones of a client device of a user, and each of the one or more particular words or phrases being associated with an assistant command; in response to determining that a portion of the audio data corresponds to one or more of the particular words or phrases, and in response to determining to verify the identity of the user that provided a spoken utterance corresponding to the audio data: processing, using a speaker identification (SID) model, the audio data to determine whether the audio data is sufficient to identify the user that provided the spoken utterance; in response to determining the audio data is sufficient to identify the user that provided the spoken utterance, and in response to determining that the identified user that provided the spoken utterance is authorized to cause performance of the assistant command that is associated with one or more of the particular words or phrases: causing an automated assistant to perform the assistant command that is associated with one or more of the particular words or phrases; and in response to determining the audio data is insufficient to identify the user that provided the spoken utterance: generating a prompt that requests additional verification of the identity of the user that provided the spoken utterance; and causing the prompt to be provided for presentation at the client device.

These and other implementations of technology disclosed herein can optionally include one or more of the following features.

In some implementations, the method may further include detecting an occurrence of a warm word activation event; and in response to detecting the occurrence of the warm word activation event, activating one or more currently dormant automated assistant functions that utilize the warm word model. Processing the stream of audio data using the warm word model to monitor for the occurrence of the one or more particular words or phrases may be in response to activating the one or more currently dormant automated assistant functions that utilize the warm word model. In some versions of those implementations, the warm word activation event may include one or more of: a phone call being received at the client device, a text message being received at the client device, an email being received at the client device, an alarm sounding at the client device, a timer sounding at the client device, media being played at the client device or an additional client device in an environment of the client device, a notification being received at the client device, a location of the client device, or a software application being accessible at the client device.

In some implementations, the method may further include, in response to determining that the portion of the audio data corresponds to one or more of the particular words or phrases, and in response to determining not to verify the identity of the user that provided the spoken utterance corresponding to the audio data: causing an automated assistant to perform the assistant command that is associated with one or more of the particular words or phrases.

In some implementations, processing the audio data to determine whether the audio data is sufficient to verify the identity of the user that provided the spoken utterance comprises: processing, using a text dependent (TD) SID model as the SID model, the portion of the audio data that corresponds to one or more of the particular words or phrases to generate a TD speaker embedding. Determining whether the audio data is sufficient to identify the user that provided the spoken utterance may include comparing, in an embedding space, the TD speaker embedding to one or more stored TD speaker embeddings stored locally at the client device; and determining, based on comparing the TD speaker embedding to the one or more stored TD speaker embeddings, whether the portion of the audio data is sufficient to verify the identity of the user that provided the spoken utterance.

In some versions of those implementations, processing the portion of the audio data that corresponds to one or more of the particular words or phrases to generate the TD speaker embedding using the TD SID model may include determining whether one or more of the stored TD speaker embeddings correspond to the particular words or phrases. Processing the portion of the audio data that corresponds to one or more of the particular words or phrases to generate the TD speaker embedding using the TD SID model is in response to determining that one or more of the stored TD speaker embeddings correspond to the particular words or phrases.

In additional or alternative versions of those implementations, generating the prompt that requests the additional verification of the identity of the user that provided the spoken utterance may include generating the prompt to request the user provide an additional spoken utterance, the additional spoken utterance being of a sufficient length to perform TI SID for utilization in verifying the identity of the user that provided the spoken utterance.

In additional or alternative versions of those implementations, the method may further include, in response to determining that the spoken utterance is a sufficient length to perform TI SID: processing, using a TI SID model as the SID model, the stream of audio data to generate a TI speaker embedding. Determining whether the audio data is sufficient to identify the user that provided the spoken utterance may include comparing, in an embedding space, the TI speaker embedding to one or more stored TI speaker embeddings stored locally at the client device; and determining, based on comparing the TI speaker embedding to the one or more stored TI speaker embeddings, whether the stream of the audio data is sufficient to verify the identity of the user that provided the spoken utterance. In some further versions of those implementations, generating the prompt that requests the additional verification of the identity of the user that provided the spoken utterance may include generating the prompt to request additional biometric information to verify the identity of the user. Requesting the additional biometric to verify the identity of the user may include requesting one or more of: fingerprint verification, or faceprint verification.

In some implementations, the method may further include receiving additional user input in response to the prompt being provided for presentation at the client device; and in response to receiving the additional user input: determining whether the additional user input is sufficient to identify the user that provided the spoken utterance. In some versions of those implementations, the method may further include, in response to determining the additional user input is sufficient to identify the user that provided the spoken utterance: causing the automated assistant to perform the corresponding assistant command.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
processing, using a warm word model, a stream of audio data to monitor for an occurrence of one or more particular words or phrases, the stream of audio data being generated by one or more microphones of a client device of a user, and each of the one or more particular words or phrases being associated with an assistant command;
in response to determining a portion of the stream of audio data corresponds to one or more of the particular words or phrases:
processing, using a voice activity detection (VAD) model, the stream of audio data to monitor for an occurrence of additional voice activity before the portion of the stream of audio data corresponds to one or more of the particular words or phrases and/or after the portion of the stream of audio data corresponds to one or more of the particular words or phrases;
in response to determining that there is no additional voice activity before the portion of the stream of audio data corresponds to one or more of the particular words or phrases and/or after the portion of the stream of audio data corresponds to one or more of the particular words or phrases:
causing an automated assistant to perform the assistant command that is associated with one or more of the particular words or phrases; and
in response to determining that there is additional voice activity before the portion of the stream of audio data corresponds to one or more of the particular words or phrases and/or after the portion of the stream of audio data corresponds to one or more of the particular words or phrases:
further processing the stream of audio data to determine whether to cause the automated assistant to perform the assistant command that is associated with one or more of the particular words or phrases.

2. The method of claim 1, wherein further processing the stream of audio data to determine whether to cause the automated assistant to perform the assistant command that is associated with one or more of the particular words or phrases comprises:
processing, using an automatic speech recognition (ASR) model, a preamble portion of the stream of audio data and/or a postamble portion of the audio data to generate ASR output,
wherein the preamble portion of the audio data precedes the portion of the stream of audio data that corresponds to the one or more particular words or phrases, and
wherein the postamble portion of the audio data follows the portion of the stream of audio data that corresponds to the one or more particular words or phrases; and
determining, based on processing the ASR output, whether the user intended the one or more particular words or phrases to cause performance of the assistant command; and
in response to determining the user intended the one or more particular words or phrases to cause performance of the assistant command that is associated with one or more of the particular words or phrases:
causing the automated assistant to perform the assistant command that is associated with one or more of the particular words or phrases.

3. The method of claim 2, further comprising:
in response to determining the user did not intend the one or more particular words or phrases to cause performance of the assistant command that is associated one or more of the particular words or phrases:
refraining from causing the automated assistant to perform the assistant command that is associated with one or more of the particular words or phrases.

4. The method of claim 2, further comprising:
obtaining the preamble portion of the audio data from an audio buffer of the client device; and/or
obtaining the postamble portion of the audio data from the stream of audio data.

5. The method of claim 2, wherein determining whether the user intended the one or more particular words or phrases to cause performance of the assistant command that is associated with one or more of the particular words or phrases based on processing the ASR output comprises:
processing, using a natural language understanding (NLU) model, the ASR output to generate NLU output, wherein the ASR output is generated based on both the preamble portion of the audio data and the postamble portion of the audio data; and
determining, based on the NLU output, whether the user intended the one or more particular words or phrases to cause performance of the assistant command.

6. The method of claim 5, further comprising:
in response to determining the NLU output is insufficient for determining whether the user intended the one or more particular words or phrases to cause performance of the assistant command that is associated with one or more of the particular words or phrases:
processing, using the ASR model, an additional postamble portion of the audio data to generate additional ASR output, wherein the additional postamble portion of the audio data follows the postamble portion of the audio data; and
determining, based on processing the additional ASR output, whether the user intended the one or more particular words or phrases to cause performance of the assistant command that is associated with one or more of the particular words or phrases.

7. The method of claim 1, further comprising:
detecting an occurrence of a warm word activation event; and
in response to detecting the occurrence of the warm word activation event, activating one or more currently dormant automated assistant functions that utilize the warm word model,
wherein processing the stream of audio data using the warm word model to monitor for the occurrence of the one or more particular words or phrases is in response to activating the one or more currently dormant automated assistant functions that utilize the warm word model.

8. The method of claim 7, wherein the warm word activation event comprises one or more of: a phone call being received at the client device, a text message being received at the client device, an email being received at the client device, an alarm sounding at the client device, a timer sounding at the client device, media being played at the client device or an additional client device in an environment of the client device, a notification being received at the client device, a location of the client device, or a software application being accessible at the client device.

9. The method of claim 1, further comprising:
processing, using an endpointing model, the stream of audio data to generate a plurality of timestamps for the stream of audio data.

10. The method of claim 9, wherein the plurality of timestamps comprise at least a first timestamp associated with a first time when the user began providing the one or more particular words or phrases, a second timestamp associated with a second time, that is subsequent to the first time, when the user finished providing the one or more particular words or phrases.

11. The method of claim 10, wherein determining that there is no additional voice activity before the portion of the stream of audio data corresponds to one or more of the particular words or phrases comprises determining that there is no voice activity prior to the first timestamp.

12. The method of claim 11, wherein determining that there is no additional voice activity after the portion of the stream of audio data corresponds to one or more of the particular words or phrases comprises determining that there is no voice activity subsequent to the second timestamp.

13. A system comprising:
at least one processor; and
memory storing instructions that, when executed by the at least one processor, cause the at least one processor to:
process, using a warm word model, a stream of audio data to monitor for an occurrence of one or more particular words or phrases, the stream of audio data being generated by one or more microphones of a client device of a user, and each of the one or more particular words or phrases being associated with an assistant command;
in response to determining a portion of the stream of audio data corresponds to one or more of the particular words or phrases:
process, using a voice activity detection (VAD) model, the stream of audio data to monitor for an occurrence of additional voice activity before the portion of the stream of audio data corresponds to one or more of the particular words or phrases and/or after the portion of the stream of audio data corresponds to one or more of the particular words or phrases;
in response to determining that there is no additional voice activity before the portion of the stream of audio data corresponds to one or more of the particular words or phrases and/or after the portion of the stream of audio data corresponds to one or more of the particular words or phrases:
cause an automated assistant to perform the assistant command that is associated with one or more of the particular words or phrases; and
in response to determining that there is additional voice activity before the portion of the stream of audio data corresponds to one or more of the particular words or phrases and/or after the portion of the stream of audio data corresponds to one or more of the particular words or phrases:
further process the stream of audio data to determine whether to cause the automated assistant to perform the assistant command that is associated with one or more of the particular words or phrases.

14. The system of claim 13, wherein the instructions to further process the stream of audio data to determine whether to cause the automated assistant to perform the assistant command that is associated with one or more of the particular words or phrases comprise instructions to:
process, using an automatic speech recognition (ASR) model, a preamble portion of the stream of audio data and/or a postamble portion of the audio data to generate ASR output,
wherein the preamble portion of the audio data precedes the portion of the stream of audio data that corresponds to the one or more particular words or phrases, and
wherein the postamble portion of the audio data follows the portion of the stream of audio data that corresponds to the one or more particular words or phrases; and
determine, based on processing the ASR output, whether the user intended the one or more particular words or phrases to cause performance of the assistant command; and
in response to determining the user intended the one or more particular words or phrases to cause performance of the assistant command that is associated with one or more of the particular words or phrases:
cause the automated assistant to perform the assistant command that is associated with one or more of the particular words or phrases.

15. The system of claim 14, wherein the instructions further cause the at least one processor to:
in response to determining the user did not intend the one or more particular words or phrases to cause performance of the assistant command that is associated one or more of the particular words or phrases:
refrain from causing the automated assistant to perform the assistant command that is associated with one or more of the particular words or phrases.

16. The system of claim 14, wherein the instructions further cause the at least one processor to:
obtain the preamble portion of the audio data from an audio buffer of the client device; and/or
obtain the postamble portion of the audio data from the stream of audio data.

17. The system of claim 13, wherein the instructions further cause the at least one processor to:
    detect an occurrence of a warm word activation event; and
    in response to detecting the occurrence of the warm word activation event, activating one or more currently dormant automated assistant functions that utilize the warm word model,
        wherein processing the stream of audio data using the warm word model to monitor for the occurrence of the one or more particular words or phrases is in response to activating the one or more currently dormant automated assistant functions that utilize the warm word model.

18. The system of claim 17, wherein the warm word activation event comprises one or more of: a phone call being received at the client device, a text message being received at the client device, an email being received at the client device, an alarm sounding at the client device, a timer sounding at the client device, media being played at the client device or an additional client device in an environment of the client device, a notification being received at the client device, a location of the client device, or a software application being accessible at the client device.

19. The system of claim 13, wherein the instructions further cause the at least one processor to:
    process, using an endpointing model, the stream of audio data to generate a plurality of timestamps for the stream of audio data,
        wherein the plurality of timestamps comprise at least a first timestamp associated with a first time when the user began providing the one or more particular words or phrases, a second timestamp associated with a second time, that is subsequent to the first time, when the user finished providing the one or more particular words or phrases,
        wherein the instructions to determine that there is no additional voice activity before the portion of the stream of audio data corresponds to one or more of the particular words or phrases comprise instructions to determine that there is no voice activity prior to the first timestamp, and
        wherein the instructions to determine that there is no additional voice activity after the portion of the stream of audio data corresponds to one or more of the particular words or phrases comprise instructions to determine that there is no voice activity subsequent to the second timestamp.

20. A non-transitory computer-readable storage medium storing instructions that, when executed by at least one processor, cause the at least one processor to perform operations, the operations comprising:
    processing, using a warm word model, a stream of audio data to monitor for an occurrence of one or more particular words or phrases, the stream of audio data being generated by one or more microphones of a client device of a user, and each of the one or more particular words or phrases being associated with an assistant command;
    in response to determining a portion of the stream of audio data corresponds to one or more of the particular words or phrases:
        processing, using a voice activity detection (VAD) model, the stream of audio data to monitor for an occurrence of additional voice activity before the portion of the stream of audio data corresponds to one or more of the particular words or phrases and/or after the portion of the stream of audio data corresponds to one or more of the particular words or phrases;
        in response to determining that there is no additional voice activity before the portion of the stream of audio data corresponds to one or more of the particular words or phrases and/or after the portion of the stream of audio data corresponds to one or more of the particular words or phrases:
            causing an automated assistant to perform the assistant command that is associated with one or more of the particular words or phrases; and
        in response to determining that there is additional voice activity before the portion of the stream of audio data corresponds to one or more of the particular words or phrases and/or after the portion of the stream of audio data corresponds to one or more of the particular words or phrases:
            further processing the stream of audio data to determine whether to cause the automated assistant to perform the assistant command that is associated with one or more of the particular words or phrases.

* * * * *